United States Patent
Pierce et al.

(10) Patent No.: US 10,860,988 B2
(45) Date of Patent: Dec. 8, 2020

(54) MANAGING DATA ITEMS CONTRIBUTED BY A PLURALITY OF APPLICATIONS

(71) Applicant: Samsung Electronics Co., Ltd., Gyeonggi-do (KR)

(72) Inventors: Jeffrey S. Pierce, Sunnyvale, CA (US); Sangwoo Han, Sunnyvale, CA (US); Selene A. Mota Toledo, San Francisco, CA (US); Mike Digman, Mountain View, CA (US); Ranhee Chung, San Francisco, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 513 days.

(21) Appl. No.: 15/478,659

(22) Filed: Apr. 4, 2017

(65) Prior Publication Data
US 2017/0293893 A1 Oct. 12, 2017

Related U.S. Application Data

(60) Provisional application No. 62/320,891, filed on Apr. 11, 2016.

(51) Int. Cl.
*G06Q 10/10* (2012.01)
*G06F 9/54* (2006.01)

(52) U.S. Cl.
CPC .......... *G06Q 10/1095* (2013.01); *G06F 9/54* (2013.01)

(58) Field of Classification Search
None
See application file for complete search history.

(56) References Cited

U.S. PATENT DOCUMENTS

| 8,255,817 | B2 | 8/2012 | Faught |
| 8,375,320 | B2* | 2/2013 | Kotler .............. G06Q 10/109 709/206 |
| 8,417,854 | B2 | 4/2013 | Weng et al. |
| 8,499,240 | B2 | 7/2013 | Richstein |
| 8,670,979 | B2* | 3/2014 | Gruber ................ G10L 15/22 704/9 |
| 8,706,503 | B2* | 4/2014 | Cheyer ............... G10L 15/22 704/275 |
| 8,799,005 | B2 | 8/2014 | Pantaliano et al. |
| 8,892,484 | B2 | 11/2014 | Sipple |
| 9,049,259 | B2 | 6/2015 | Rathod |
| 9,307,047 | B2 | 4/2016 | Chung et al. |
| 9,477,522 | B2* | 10/2016 | Harper ............... G06F 9/4881 |
| 9,858,925 | B2* | 1/2018 | Gruber ............... G10L 15/18 |
| 10,057,736 | B2* | 8/2018 | Gruber .................. H04W 4/16 |
| 10,241,644 | B2* | 3/2019 | Gruber ........... G06Q 10/1097 |
| 2006/0149566 | A1 | 7/2006 | Lin |
| 2008/0263010 | A1 | 10/2008 | Roychoudhuri et al. |
| 2011/0173235 | A1 | 7/2011 | Aman et al. |

(Continued)

*Primary Examiner* — Mehmet Yesildag
(74) *Attorney, Agent, or Firm* — Cuenot, Forsythe & Kim, LLC

(57) ABSTRACT

A plurality of data items can be managed using a processor. The plurality of data items can be contributed by a plurality of applications. The plurality of data items can include at least scheduled events, scheduled tasks and previous activities. Information corresponding to at least the scheduled events, scheduled tasks and previous activities can be presented. The plurality of data items can be managed based on knowledge and meaning of content of the plurality of data items.

24 Claims, 12 Drawing Sheets

(56) References Cited

U.S. PATENT DOCUMENTS

| | | | |
|---|---|---|---|
| 2012/0310880 A1* | 12/2012 | Giampaolo | G06F 16/2471 |
| | | | 707/610 |
| 2013/0115927 A1* | 5/2013 | Gruber | H04W 4/16 |
| | | | 455/414.1 |
| 2014/0033071 A1* | 1/2014 | Gruber | G06Q 10/06311 |
| | | | 715/752 |
| 2015/0227518 A1 | 8/2015 | Kallan | |
| 2016/0004565 A1* | 1/2016 | Harper | G06F 3/04842 |
| | | | 718/102 |
| 2016/0162642 A1 | 6/2016 | Atkinson | |
| 2016/0370879 A1* | 12/2016 | Sharma | G06F 3/0312 |
| 2017/0083179 A1* | 3/2017 | Gruber | G06Q 10/1097 |
| 2019/0014450 A1* | 1/2019 | Gruber | H04W 4/16 |

* cited by examiner

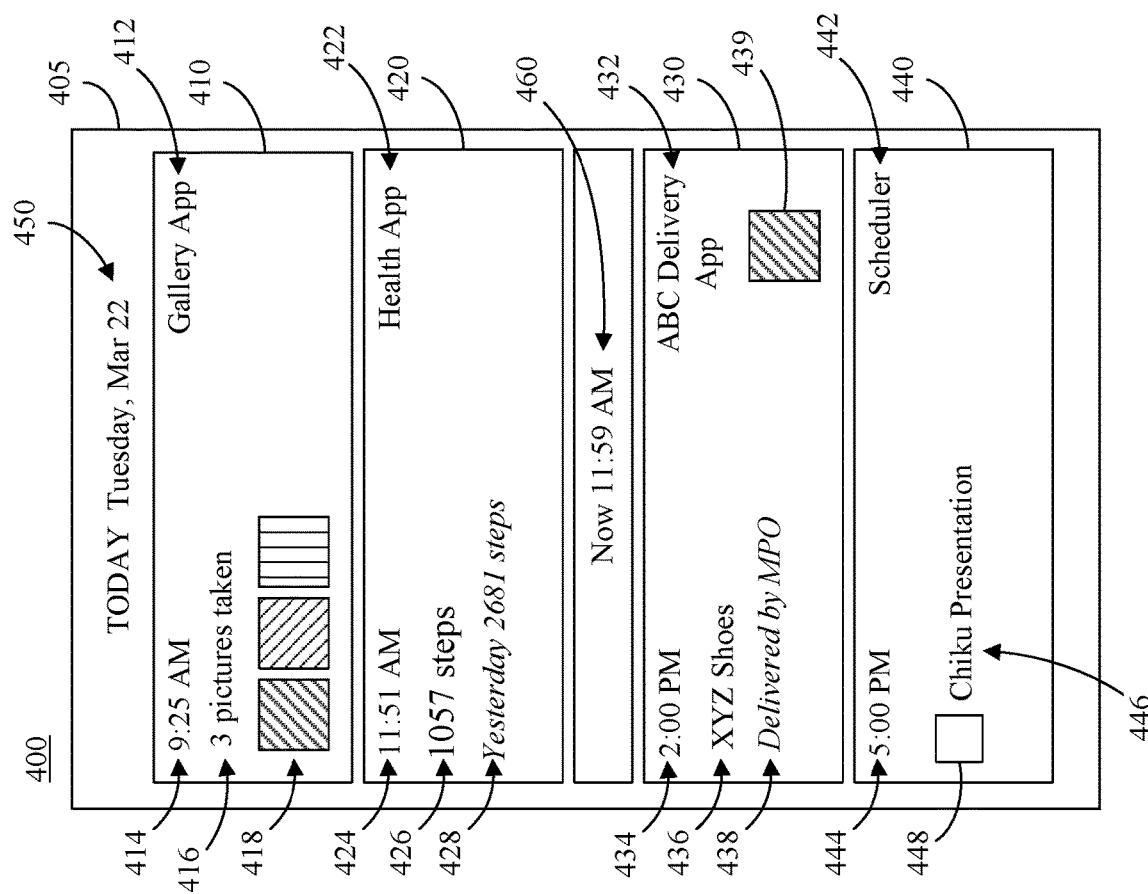
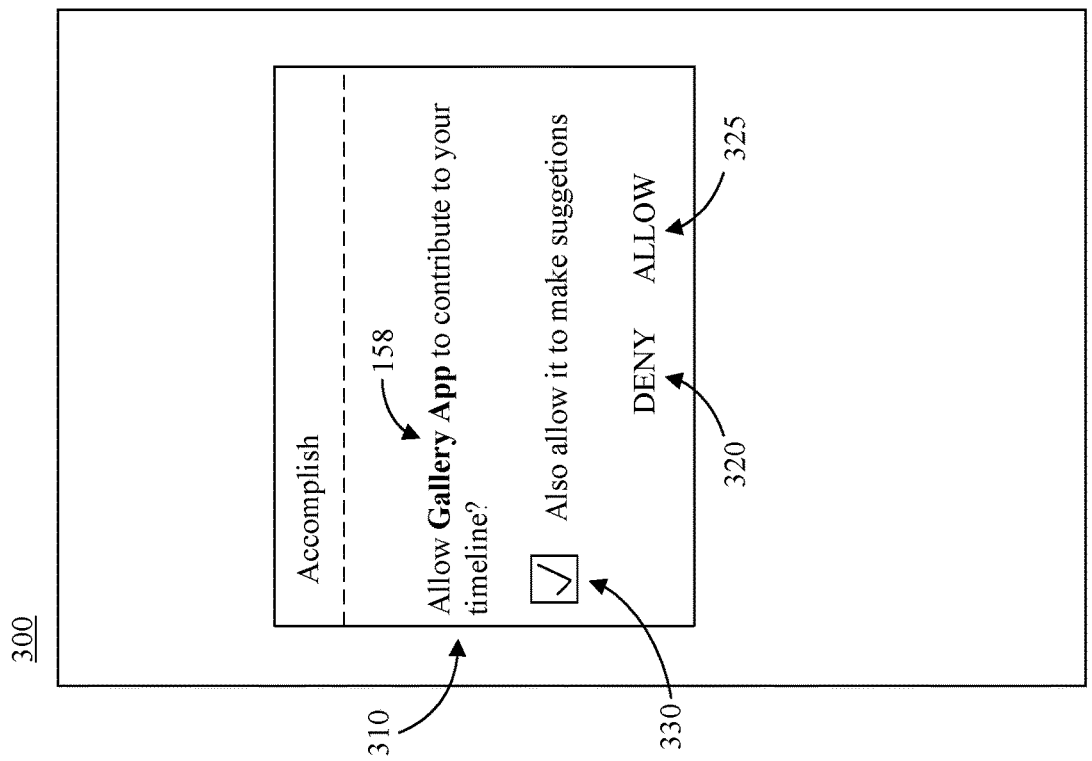
FIG. 4
FIG. 3

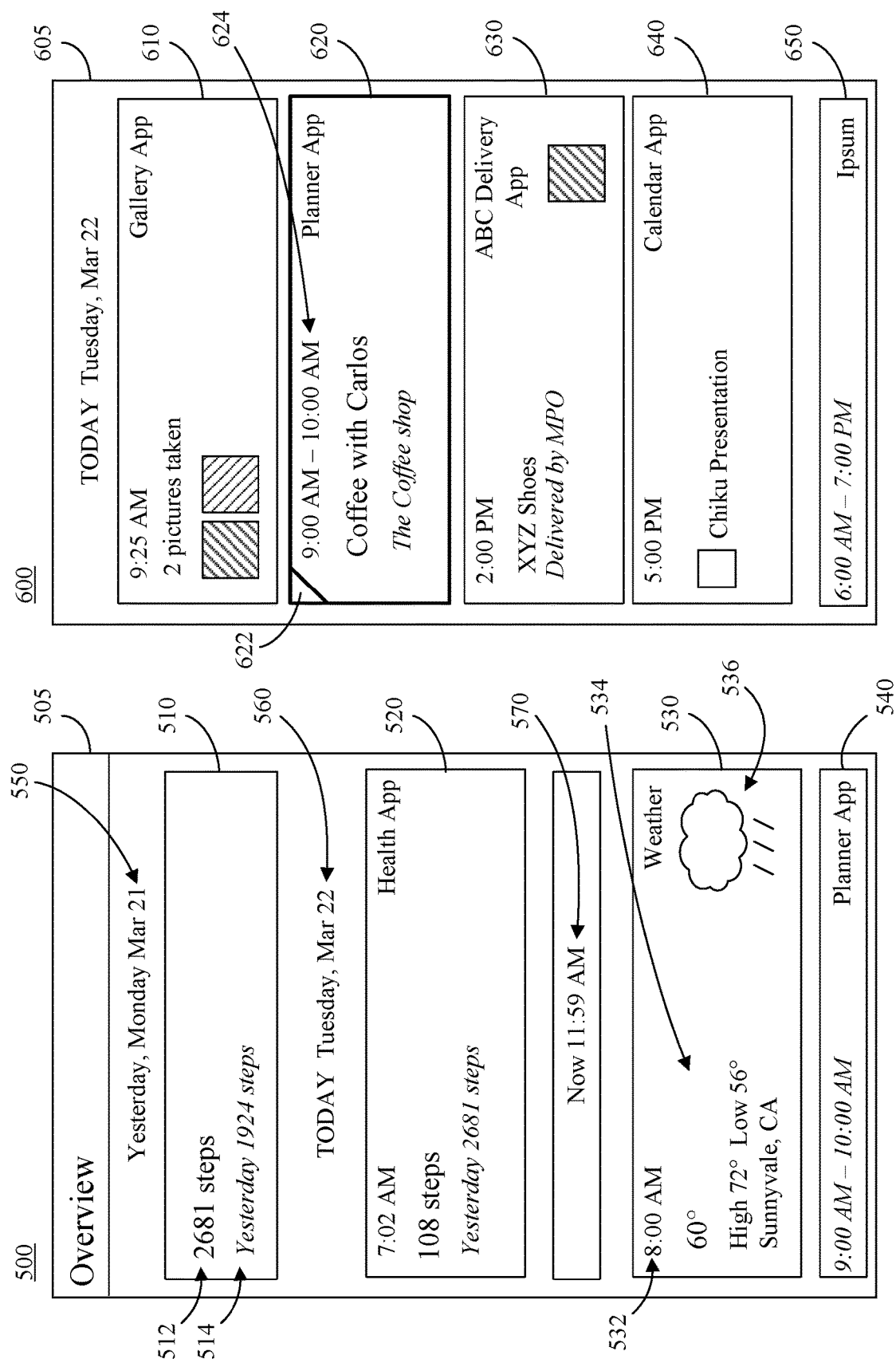

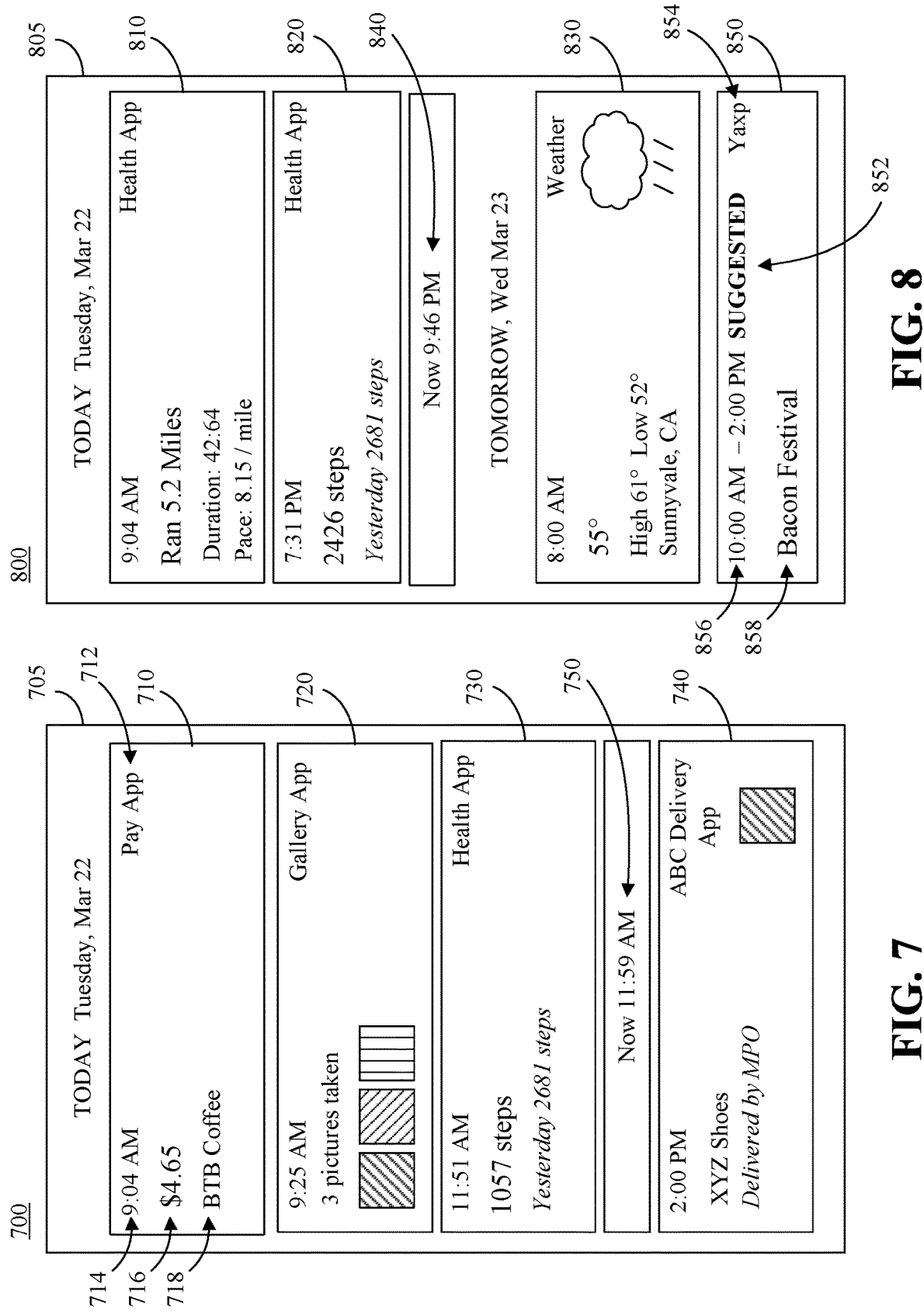

1300

Manage, using a processor, a plurality of data items contributed by a plurality of applications, the plurality of data items includes at least scheduled events, scheduled tasks and previous activities, wherein the plurality of data items is managed based on knowledge and meaning of content of the plurality of data items
1305

Present information corresponding to at least the scheduled events, scheduled tasks and previous activities
1310

Register an application to contribute data items to a data manager
1405

Assign a data token to the application, communicate the data token to the application and store a copy of the data token
1410

Receive from the application a new data item and the data token
1415

Validate the data token
1420

Responsive to the data token successfully validating, add the data item to a timeline
1425

FIG. 14

MANAGING DATA ITEMS CONTRIBUTED BY A PLURALITY OF APPLICATIONS

CROSS-REFERENCE TO RELATED APPLICATIONS

This application claims the benefit of U.S. Application No. 62/320,891 filed on Apr. 11, 2016, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to data processing and, more particularly, to management of data items.

BACKGROUND

Tracking of users' activities are increasingly distributed across multiple applications. For instance, users may use a calendar to schedule upcoming events, a social application to track upcoming group activities, a reservation application to make and track upcoming reservations, an airline application to track an upcoming flight, a fitness application to track steps or runs, a financial application to track payments and upcoming bills, etc. A consequence of using multiple applications to track various user activities is that users may find it necessary to interface with each of the various applications when planning their day or reflecting on how their day went. Moreover, if a user forgets to check one of the applications, the user may miss relevant information.

SUMMARY

A method can include managing, using a processor, a plurality of data items contributed by a plurality of applications. The plurality of data items can include at least scheduled events, scheduled tasks and previous activities. The method also can include presenting information corresponding to at least the scheduled events, scheduled tasks and previous activities. The plurality of data items can be managed based on knowledge and meaning of content of the plurality of data items.

An apparatus can include a memory configured to store instructions and a processor coupled to the memory, wherein the processor, in response to executing the instructions, is configured to initiate operations. The operations can include managing a plurality of data items contributed by a plurality of applications. The plurality of data items can include at least scheduled events, scheduled tasks and previous activities. The operations also can include presenting information corresponding to at least the scheduled events, scheduled tasks and previous activities. The plurality of data items can be managed based on knowledge and meaning of content of the plurality of data items.

A computer program product can include a computer readable storage medium having program code stored thereon, the program code executable by a processor to perform operations. The operations can include managing a plurality of data items contributed by a plurality of applications. The plurality of data items can include at least scheduled events, scheduled tasks and previous activities. The operations also can include presenting information corresponding to at least the scheduled events, scheduled tasks and previous activities. The plurality of data items can be managed based on knowledge and meaning of content of the plurality of data items.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIG. 3 depicts an example of a view presented by a user interface.

FIG. 4 depicts another example of a view presented by the user interface.

FIG. 5 depicts another example of a view presented by the user interface.

FIG. 6 depicts another example of a view presented by the user interface.

FIG. 7 depicts another example of a view presented by the user interface.

FIG. 8 depicts another example of a view presented by the user interface.

FIG. 13 is a flow chart illustrating an example of a method of managing a plurality of data items contributed by a plurality of applications.

FIG. 14 is a flow chart illustrating another example of a method of managing a plurality of data items contributed by a plurality of applications.

DETAILED DESCRIPTION

Figure 1:
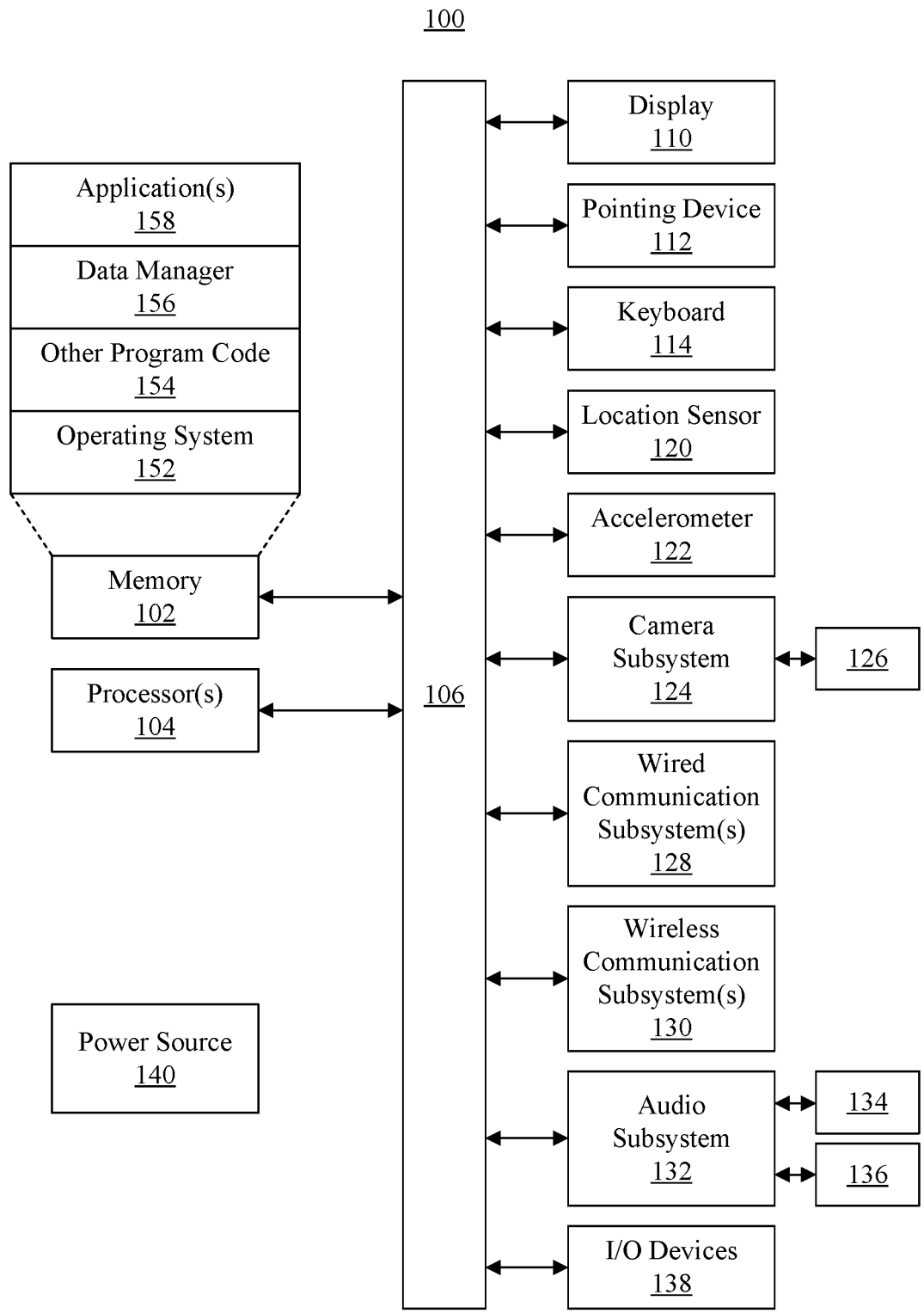
FIG. 1 is block diagram illustrating example architecture for a data processing system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data processing and, more particularly, to management of data items. The data items can represent upcoming events, upcoming activities, scheduled tasks, previous tasks and previous activities. Upcoming events and activities can be, for example, scheduled tasks and activities, anticipated events and activities, and so on. In accordance with the inventive arrangements disclosed herein, a data manager can manage a plurality of data items contributed by a plurality of applications external to the data manager. In this regard, the data manager can include a programmatic interface via which the data manager receives data items from the plurality of applications external to the data manager.

Further, the data manager can support information corresponding to the upcoming events, upcoming activities, scheduled tasks, previous tasks and previous activities. In this regard, the data manager can present various views related to the data items. For example, the data manager can include a user interface manager that manages a user interface to present the views on a display. The views can include timelines in which the data items are presented in a temporal order, for example as summary views. The views also can include detail views presenting detailed information for the data items and other information related to the data items, and views for creating data items. Rather than having to open the various applications in order to view data items contributed by those applications, users need only be presented with the views generated by the data manager. Moreover, various views presented by the data manager can provide user interface elements and fields via which users can enter user inputs used by the data manager to manage the data items contributed by the various application. Thus, users need not be bothered with actually opening the applications contributing the data items in order to manage the data items.

Additionally, users can choose which applications contribute data items to the data manager for presentation. Thus, the data manager can present to users only data items users choose to view. Moreover, users can specify temporal ranges of data items they desire to be presented. For example, users can choose to view data items for today, data items for today and tomorrow, data items for yesterday, today and tomorrow, etc. In addition, users can choose to view only data items representing activity not yet completed, or both activity that is completed and activity that is not yet completed.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example data processing system (hereinafter "system") 100 in accordance with one or more embodiments described within this disclosure. System 100 can include a memory 102, one or more processors 104 (e.g., image processors, digital signal processors, data processors, etc.), and interface circuitry 106. In one aspect, memory 102, processor(s) 104, and/or interface circuitry 106 are implemented as separate components. In another aspect, memory 102, processor(s) 104, and/or interface circuitry 106 are integrated in one or more integrated circuits. The various components in system 100, for example, can be coupled by one or more communication buses, input/output (I/O) subsystems, or signal lines (e.g., interconnects and/or wires) represented as interface circuitry 106. In one aspect, memory 102 may be coupled to interface circuitry 106 via a memory interface (not shown).

Sensors, devices, subsystems, and/or I/O devices can be coupled to interface circuitry 106 to facilitate the functions and/or operations described within this disclosure including the generation of sensor data. The various sensors, devices, subsystems, and/or I/O devices may be coupled to interface circuitry 106 directly or through one or more intervening I/O controllers (not shown).

For example, display 110 can be coupled to interface circuitry 106. In one non-limiting arrangement, display can be a touch sensitive display (e.g., a touchscreen). A touch sensitive display is configured to detect contact, movement, breaks in contact, etc., using any of a variety of touch sensitivity technologies. Example touch sensitive technologies include, but are not limited to, capacitive, resistive, infrared, and surface acoustic wave technologies, other proximity sensor arrays or other elements for determining one or more points of contact with a touch sensitive display, etc.

Optionally, pointing device 112 and/or keyboard 114 (and/or keypad) can be coupled to interface circuitry 106. Examples of pointing device 112 include, but are not limited to, a mouse, a touchpad, trackpad, a trackball, a joystick, a stylus, etc. A touchpad or trackpad, for instance, can include any of the touch sensitive technologies described above.

Further, location sensor 120 (e.g., a GPS receiver and/or processor) can be connected to interface circuitry 106 to provide geo-positioning sensor data. Accelerometer 122 can be connected to interface circuitry 106 to provide sensor data that can be used to determine change of speed and direction of movement of the system in 3-dimensions. System 100 also can include any of a variety of other sensors, and the present arrangements are not limited in this regard.

Camera subsystem 124 can be coupled to an optical sensor 126. Optical sensor 126 can be implemented using any of a variety of technologies. Examples of optical sensor 126 can include, but are not limited to, a charged coupled device (CCD), a complementary metal-oxide semiconductor (CMOS) optical sensor, etc. Camera subsystem 124 and optical sensor 126 can be used to facilitate camera functions, such as recording images and/or video clips (hereafter "image data"). In one aspect, image data is a subset of sensor data.

Communication functions can be facilitated through one or more wired communication subsystems 128 and/or wireless communication subsystems 130. Wired communication subsystems 128 can include one or more wired network adapters. Examples of wired network adapters include, but are not limited to, modems, cable modems and Ethernet cards. Wireless communication subsystems 130 can include, but are not limited to, radio frequency receivers and transmitters, optical (e.g., infrared) receivers and transmitters, and so forth. The specific design and implementation of wireless communication subsystems 130 can depend on the particular type of system 100 implemented and/or the communication network(s) over which system 100 is intended to operate.

For purposes of illustration, wireless communication subsystem(s) 130 may be designed to operate over one or more mobile networks, WiFi networks which may include WiMax network(s), personal area networks (e.g., Bluetooth networks), and/or any combination of the foregoing. In another aspect, wireless communication subsystem(s) 130 are capable of implementing hosting protocols such that system 100 can be configured as a base station for other wireless devices.

Audio subsystem 132 can be coupled to one or more output audio transducers (e.g., speaker(s)) 134 and one or more input audio transducers (e.g., microphone(s)) 136 to facilitate voice-enabled functions, such as voice recognition, voice replication, digital recording, speech and/or audio processing, and telephony functions. Audio subsystem 132 is capable of generating audio type sensor data.

Additional I/O devices 138 can be coupled to interface circuitry 106. Examples of I/O devices 138 can include, but are not limited to, communication ports (e.g., USB ports, IEEE 1394 ports, parallel ports, serial ports, etc.), buttons or other physical controls, and so forth.

System 100 further includes a power source 140. Power source 140 is capable of providing electrical power to the various elements of system 100. In an arrangement, power source 140 is implemented as one or more batteries. The batteries may be implemented using any of a variety of different battery technologies whether disposable (e.g., replaceable) or rechargeable. In another embodiment, power source 140 is configured to obtain electrical power from an external source and provide power (e.g., DC power) to the elements of system 100. In the case of a rechargeable battery, power source 140 further may include circuitry that is capable of charging the battery or batteries when coupled to an external power source.

Memory 102 can include random access memory (e.g., volatile memory) and/or non-volatile memory, such as one or more magnetic disk storage devices, one or more optical storage devices, flash memory, etc. Memory 102 can store operating system 152, such as LINUX, UNIX, a mobile operating system (e.g., Android™), an embedded operating system, etc. Operating system 152 may include instructions for handling system services and for performing hardware dependent tasks.

Memory 102 may also store other program code 154. Examples of other program code 154 may include instructions that facilitate communicating with one or more additional devices, one or more computers and/or one or more servers; graphic user interface operations; sensor-related operations; phone-related operations; electronic-messaging related operations; Web browsing-related operations; media processing-related operations; GPS and navigation-related operations; security operations; camera-related operations including Web camera and/or Web video operations; and so forth. Memory 102 may also store one or more other application(s) 162.

Memory 102 may store data manager 156 and other applications 158 external to data manager 156. Data manager 156 can interface with other applications 158, manage data items on behalf of other applications 158, present data items via a user interface, for example by writing data items to display 110 and/or generating audio signals representing data items via audio subsystem 132, etc. As defined herein, the term "data manager" means an application or service that interfaces with one or more other applications in order to manage data items contributed by the other applications. As the term "data manager" is defined herein, a skeleton user interface is not a data manager. Instead, a skeleton user interface is a user interface that receives user interface elements to display without any knowledge or understanding of content contained in the user interface elements. With a skeleton user interface, the individual user elements themselves, or the other applications that provide the user interface elements, handle displaying content of the user interface elements and support user interaction with the user interface elements, without any participation by the skeleton interface in supporting the user interaction. In other words, a skeleton user interface provides a framework for organizing user interface elements that other entities (e.g., other applications) provide to the skeleton user interface, but the skeleton user interface knows nothing about what the content represented by the user interface elements actually is or what such content means. In contrast, the "data manager" described herein has knowledge and a computer understandable meaning of the content.

Further aspects of operations performed through execution of data manager 156 and other applications 158 are described herein with reference to the remaining figures.

The various types of instructions and/or program code described are provided for purposes of illustration and not limitation. The program code may be implemented as separate software programs, procedures, or modules. Memory 102 can include additional instructions or fewer instructions. Furthermore, various functions of system 100 may be implemented in hardware and/or in software, including in one or more signal processing and/or application specific integrated circuits.

Program code stored within memory 102 and any data items used, generated, and/or operated upon by system 100 are functional data structures that impart functionality when employed as part of the system. Further examples of functional data structures include, but are not limited to, sensor data, data obtained via user input, data obtained via querying external data sources, biological marker data, baseline data, and so forth. The term "data structure" refers to a physical implementation of a data model's organization of data within a physical memory. As such, a data structure is formed of specific electrical or magnetic structural elements in a memory. A data structure imposes physical organization on the data stored in the memory as used by a processor.

In one or more embodiments, one or more of the various I/O devices, sensors and/or subsystems described with reference to system 100 may be separate devices that are coupled or communicatively linked to system 100 through wired or wireless connections. For example, one or more, or all, of display 110, pointing device 112, keyboard 114, location sensor 120, accelerometer 122, camera subsystem 124, audio subsystem 132, and so forth may be implemented as separate systems or subsystems that couple to system 100 by way of I/O devices 138 and/or wireless communication subsystem(s) 130.

One or more of the sensors (not shown) may be worn directly by the user and provide data to system 100 via a wired or wireless connection. Examples of additional sensors that are not illustrated in FIG. 1, but which may be used and/or worn by a user to provide sensor data to system 100 can include, but are not limited to, step counter sensors, heart rate sensors, electrocardiography (ECG) sensors, photoplethysmography (PPG) sensors, respiratory sensors, galvanic skin response (GSR) sensors, gyroscopes, proximity sensors, light detection sensors, etc. In one or more embodiments, sensors and/or subsystems as described herein are configured to generate sensor data that is stored in a memory external to system 100. In that case, system 100, e.g., processors 104, may access the sensor data for use and/or analysis as described herein.

System 100 may include fewer components than shown or additional components not illustrated in FIG. 1 depending upon the particular type of system that is implemented. In addition, the particular operating system and/or application(s) and/or other program code included may also vary according to system type. Further, one or more of the illustrative components may be incorporated into, or otherwise form a portion of, another component. For example, a processor may include at least some memory.

System 100 is provided for purposes of illustration and not limitation. A device and/or system configured to perform the operations described herein may have a different architecture than illustrated in FIG. 1. The architecture may be a simplified version of the architecture described in connection with system 100 and include a processor and memory storing instructions. The architecture may include one or more sensors or subsets of sensors as described herein. System 100, or a system similar to system 100, is capable of collecting sensor data using the various sensors of the device or sensors coupled thereto. It should be appreciated, however, that system 100 may include fewer sensors or additional sensors. Within this disclosure, data generated by a sensor is called "sensor data."

Examples implementations of system 100 may include, but are not limited to, a smart phone or other mobile device or phone, a wearable computing device (e.g., smart watch, fitness tracker, patch, etc.), a computer (e.g., desktop, laptop, tablet computer, other data processing system, etc.), and any suitable electronic device capable of sensing and processing the sensor data. In an example embodiment, a smart watch or fitness tracker may be paired to operate with a mobile phone or other data processing system. The mobile phone may or may not be configured to interact with a remote server and/or computer system.

Figure 2:
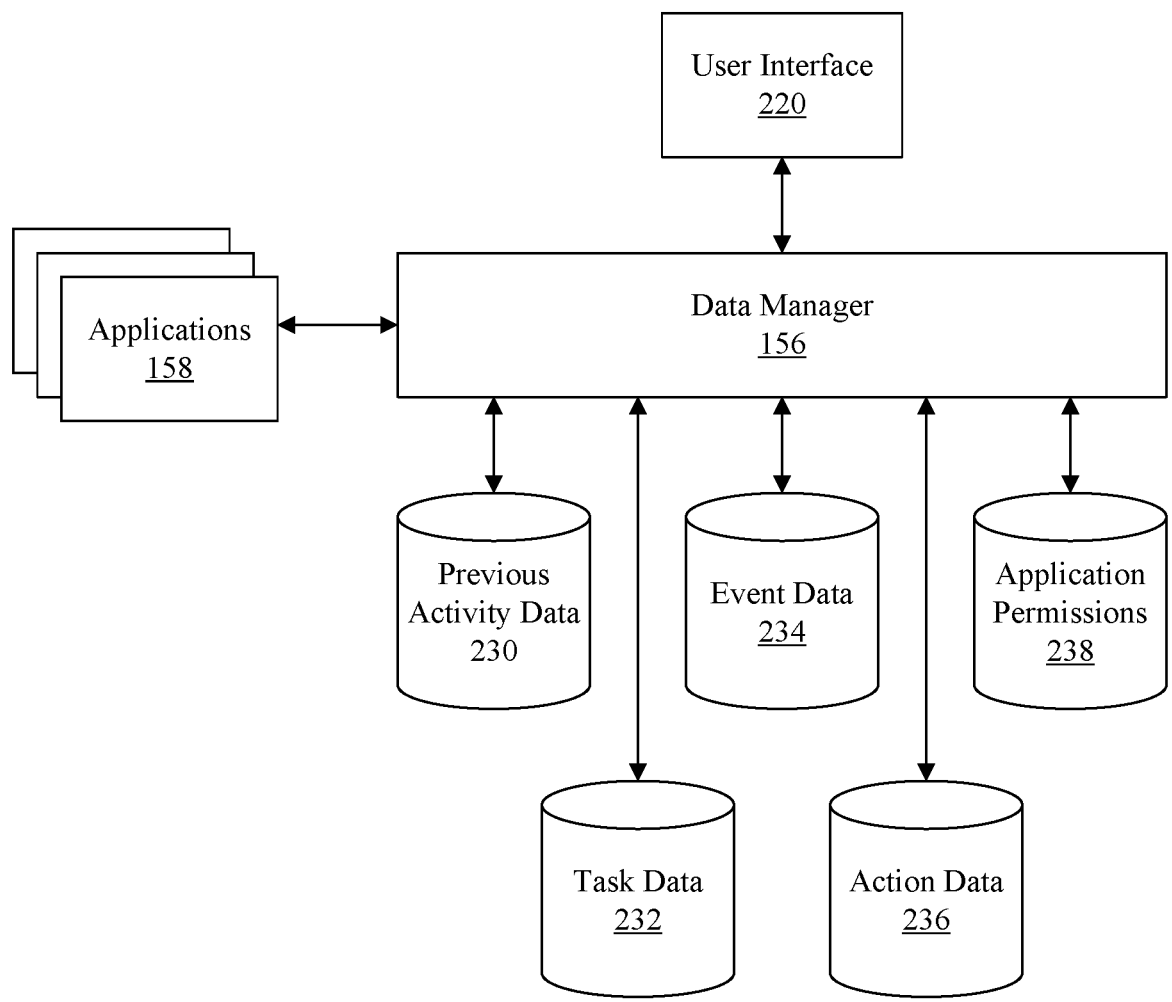
FIG. 2 illustrates an example of a data management framework executable by a data processing system as described in connection with FIG. 1.

FIG. 2 illustrates an example of a data management framework 200 executable by a data processing system as described in connection with FIG. 1. Data management framework 200 provides a platform that manages data items submitted by other applications 158 and can create a timeline user interface that allows users to browse and interact with the data items. Data management framework 200 supports different types of data items, which will be discussed.

Data management framework 200 can include data manager 156, applications 158 and a user interface 220 controlled, at least in part, by data manager 156. In one arrangement, user interface 220 can be a component of data manager 156, but the present arrangements are not limited in this regard.

Data manager 156 can interface with applications 158 to identify various data items managed by the applications 158. By interfacing with applications 158, data manager 156 can take, at least in part, control of the data items. The data items can include, but are not limited to, previous activity data 230, task data 232, event data 234 and action data 236. Further, data manager 156 can manage application permissions 238. Application permissions 238 can be owned by data manager 156, but granted to applications 158. Data manager 156 can verify application permissions 238 when applications 158 contribute data items to data manager 156 to verify applications 158 are granted authorization to do so. As will be described, data manager 156 can assign data tokens to applications 158 to facilitate verification that applications 158 are granted the authorizations.

Previous activity data 230 can include data for activities (e.g., tasks, events, actions and/or other activities) assigned to one or more users performed and/or attended prior to a current time. The user(s) can include a user to whom data manager 156 is assigned, for example a user of system 100. Task data 232 can include data for tasks assigned to one or more users. For example, a task can be assigned to the user of system 100. Event data 234 can include data for events, for example upcoming events. An upcoming event can be, for example, an event the user of system 100 is scheduled to attend, an event the user of system 100 is tentatively scheduled to attend, an event the user of system 100 is monitoring, and/or an event recommended for the user of system 100. Action data 236 can include data for actions performed by users, such as unscheduled actions. For example, an action can be physical activity performed, the taking of pictures and/or video, a purchase transaction, and so on, which was not previously scheduled as a task or event.

In one non-limiting arrangement, responsive to the user indicating that a task, event and/or action has been completed, data manager 156 can automatically re-classify such task, event and/or action as previous activity data 230. For example, data manager 156 can update database records for the task and/or event to indicate a completed status and/or move corresponding data to a data table that stores the previous activity data 230. Data manager 156 also can notify applications 158 that tasks and/or events are completed in response to the tasks and/or events being completed. In another arrangement, data manager 156 can automatically re-classify a task and/or event as previous activity data 230 responsive to the current time moving past a time the task and/or event was scheduled to take place.

Application permissions 238 can include data pertaining to permissions assigned to applications 158 by data manager 156. The assigned permissions can include, for example, permissions for the applications 158 to update previous activity data 230, task data 232, event data 234, and/or action data 236. In illustration, to prevent applications 158 from filling the user's timeline with unwanted information, in one arrangement, data manager 156 can require that users explicitly grant permission for various applications 158 to contribute data items for presentation in the user's timeline by user interface 220. In this regard, each application 158 can be configured to request from data manager 156 permission to contribute data items to the timeline. In response to receiving such a request, data manager 156 can present to the user, via user interface 220, a view asking the user if the user chooses to deny or allow the requesting application 158 to contribute data items to the timeline.

FIG. 3 depicts an example of a view 300 presented by user interface 220, on display 110 (FIG. 1), which presents a question 310 asking the user if the user chooses to deny or allow the requesting application 158 to contribute data items to the timeline. View 300 also can include a user selectable user interface element 320 the user may select to deny application 158 permission to contribute data items to the timeline, and a user selectable user interface element 325 the user may select to allow application 158 (e.g., grant permission to application 158) to contribute data items to the timeline. Further, view 300 can include a user selectable user interface element 330 the user may select to allow application 158 to contribute to the timeline data items pertaining to suggestions. Such data items, for example, can present suggestions for upcoming events the user may consider attending, suggestions for restaurants to visit, and so on. Responsive to the user selecting user interface element 325, a method assigned to user interface element 325 can communicate a corresponding parameter to data manager 156. In response, data manager 156 can register application 158 with data manager 156. If user has also selected user interface element 330, data manager 156 can include in the registration data indicating that application 158 is authorized to contribute to the timeline data items pertaining to suggestions.

Referring again to FIG. 2, in one aspect of the present arrangements, responsive to the user choosing to allow application 158 to contribute data items to the timeline, data manager 156 can assign a data token to application 158, communicate the data token to application 158, and store a copy of the data token. In this regard, application 158 can be registered with data manager 156. In such an arrangement, data manager 156 can require application 158 to include its assigned data token when submitting data items to data manager 156 for the timeline, or updating its data items previously communicated to data manager 156, in order for application 158 to verify its identity and confirm that application 158 has permission to contribute/update data items to the timeline. Further, as will be described, in addition to data items, application 158 can define various fields presented in one or more views by data manager 156. Application can provide the data token to authenticate with data manager 156 when providing data for the various defined fields. The data token can be, for example, a randomly generated value or string (e.g., alphanumeric string), but the present arrangements are not limited in this regard, and any other value or string unique to application 158 can be used. Data manager 156 can store a copy of the data token in application permissions 238, along with data indicating permissions assigned to application 158. A user may choose to allow a plurality of applications 158 to contribute data items. Each of the plurality of applications chosen by the user can be assigned a respective data token that is unique to that application 158.

In addition to granting access permission as a binary choice (allow/deny), other arrangements may provide more granular permission choices. For example, as noted, the user may select to allow application 158 to contribute to the timeline data items pertaining to suggestions. In another example, data manager 156 can receive one or more user inputs specifying that application 158 only be allowed to contribute certain types of data items (e.g., only tasks). In a further example, data manager 156 can receive one or more user inputs specifying that permission for application 158 to contribute data items expire after a specified time period or a default time period. Further arrangements also can include data manager 156 allowing users to specify how frequently applications are allowed to submit data items (e.g., at most one data item per day, five data items per week, no more than one data item every 4 hours, etc.). Still further, data manager 156 can be configured to receive any of a myriad of other user inputs specifying permissions pertaining to submitting and/or updating data items by applications 158, and the present arrangements are not limited in this regard.

In another aspect of the present arrangements, one or more of the applications 158, by default, can be authorized to contribute data items to the timeline and be assigned respective data tokens. In such an arrangement, data manager 156 can present, via user interface 220, a listing of the applications 158. In the listing, the user can select applications 158 to block (e.g., opt out) those applications 158 from contributing data items to the timeline.

Applications 158 that have been authorized to contribute data items to the timeline can communicate such data items to data manager 156. In illustration, an application 158 can pass a data item, along with a data token assigned to application 158, to operating system 152 (FIG. 1). Further, application 158 can provide to operating system 152 data indicating that the data item is to be passed to data manager 156. In response to receiving the data item and data, operating system 152 can pass the data item, with the data token, to data manager 156. Operating system 152 can indicate to data manager 156 application 158 from which the data item is being passed, though this need not be the case. Data manager 156 can process the data token and, based on such processing, determine whether the data token is valid, verify to which application 158 the data token is assigned, and determine the valid permissions for application 158.

If data manager 156 determines that the data token is invalid and/or does not match the data token assigned to application 158, data manager 156 can generate an exception (e.g., an error), which operating system 152 can store in a data log, and ignore and/or reject the data item. Further, data manager 156 can notify application 158 contributing the data item that the data item has been ignored/rejected. For example, if application 158 has a bi-directional communication channel established with data manager 156, the request to contribute the data item can include a return address of application 158, and data manager 156 can communicate a notification to application 158 using the return address. Such notification can include the token provided by application 158 and an indicator indicating the data item has been ignored/rejected.

If data manager 156 determines that the data token is valid and/or matches the data token assigned to application 158, data manager 156 can determine that application 158 to which the data token is assigned has authorization to add the data item and, in response, data manager 156 can add the data item to the timeline, for example by adding the data item to task data 232, event data 234 or action data 236, depending on the type and/or nature of the data item. Further, data manager 156 can identify a type and/or nature of the data item (e.g., a task, financial activity, a calendar event, fitness activity, a shipment delivery, etc.).

In one arrangement, applications 158 may assign a particular type to a data item (e.g., a task, financial activity, a calendar event, fitness activity, shipment delivery, etc.). In another arrangement, data manager 156 can identify the type and/or nature of data items by performing natural language processing (NLP) and semantic analysis on information contained in the data items to gain knowledge and meaning of the data items. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by data manager 156 to implement NLP and semantic analysis.

Applications 158 may submit data items that occur at a specific point in time (e.g., a purchase) or data items that have separate start and end times (e.g., a scheduled flight). Data manager 156 can choose how to present the data item, and which shortcut actions to provide, based on the type assigned to the data item. In another arrangement, an application 158 may submit preferred summary and detail views for a data item directly rather than specifying a type. Data manager 156 can use the preferred summary and detail views for the data item for presentation. Other aspects can include various combinations of those alternatives. In illustration, an application 158 may submit a data item with a type that data manager 156 uses to choose the summary view, but application 158 may provide a desired detail view used by data manager 156 for presentation of a detail view of the data item. For example, application 158 can specify a data item type that determines the basic summary or detail views, and these basic views can be extended with custom view content. Still, other ways of presenting various views of data items can be implemented, and the present arrangements are not limited in this regard.

When submitting a data item, an application 158 may specify a unique identifier (ID) for the data item. In another aspect, responsive to receiving a data item, data manager 156 may assign an ID to the data item and communicate the ID back to the submitting application 158. Application 158 may use that ID to submit updates to the data item (e.g., changing the scheduled departure time for a delayed flight) or to remove the data item from the timeline completely (e.g., if the user makes a purchase but then cancels the transaction). In a further arrangement, in addition to the ID, data manager 156 also may require the data token assigned to application 158, and validate the data token prior to implementing updates to the data item. If the data token does not pass validation, data manager 156 can generate an exception (e.g., an error).

Data manager 156 also may use the ID assigned to a data item in order to communicate actions on the data item back to the originating application 158. For example, if the user marks a task from an application as being complete, data manager 156 may use the ID for the data item to communicate to the originating application 158 data indicating that the task has been completed. For example, data manager 156 can generate a message including the ID, and indicate in the message that the data item represented by the ID has been completed. Application 158 can process the message to update its copy of the data item to mark the data item as being completed. In another arrangement, applications 158 may specify how data manager 156 communicates actions on data items back to applications 158. For example, an application 158 might provide a URL for data manager 156 to access in order to indicate a task being completed in response to the user indicating the task has been completed.

When data manager 156 presents user interface 220 to users, data manager 156 can choose which submitted data items that user interface 220 presents to the user, for example in one or more timeline views. Data manager 156 can base the choice on the current time indicated on the system 100 and a desired temporal window of activity to display. For instance, in one arrangement, data manager 156 can manage user interface 220 to show data items from yesterday, today, and tomorrow, as well as any currently incomplete tasks. In another arrangement, data manager 159 can allow users to view any data item, no matter how old the data item is or far out in time the data item is scheduled.

Responsive to data manager 156 determining which data items fall within the desired temporal window, data manager 156 can further filter the data items based on the current time. In one aspect, data manager 156 can explicitly distinguish between previous activities and upcoming events. Further, data manager 156 can choose to display only upcoming events that fall during or after the current time. Data manager 156 can automatically convert upcoming events to previous activities after the events finish, unless the originating application 158 explicitly chooses to disable the conversion. In another aspect, if an application 158 requests to display information about an event once it has passed, application 158 can create separate, corresponding, previous activity data 230 for that event.

Further, via user interface 220, data manager 156 can present a plurality of different views. In illustration, data manager 156 can provide a menu of views (not shown), and the user of system 100 can choose one or more views from the menu for presentation. In one aspect of the present arrangements, the user can choose a default view. Via user interface 220, data manager 156 can present the default view responsive to startup of system 100 and/or responsive to system 100 waking from sleep mode. Additionally, the user can initiate presentation of one or more views by selecting a data item and/or a menu item presented in a current view, as will be described.

In the following description of FIGS. 4-12, various views are described as being presented by user interface 220. It will be understood that the various views presented by user interface 220 are managed by data manager 156.

FIG. 4 depicts another example of a view 400 presented by user interface 220. View 400 can present a timeline 405. Timeline 405 can include data items 410, 420, 430, 440 contributed by a plurality of applications 158 to data manager 156. Data items 410-440 can be data items that represent actions, tasks, events, etc. As presented in timeline 405, data items 410-440 can be presented as summary views of the data items 410-440. As will be described, detailed views of data items can be presented in other user interface views.

Data items 410-440 can be data items that are scheduled for a particular day 450, for example "TODAY." Timeline 405 can present data items 410-440 in timeline 405 as a temporally ordered list of data items. In this regard, data manager 156 can temporally order data items 410-440. When temporally ordering data items 410-440, data manager 156 need not attempt to predict which ones of data items 410-440 to selectively display, nor predict how to order them. Instead, data manager 156 can base the temporal order on when the actions, tasks, events, etc. occurred and/or are scheduled to take place.

In the present example, data items 410, 420 can represent actions, tasks, events that occurred prior to the current time. Timeline 405 can present an indicator 460 indicating the current time, and temporally order the indicator 460 between data items 410, 420 and scheduled data items 430, 440 which have not yet occurred. In this regard, indicator 460 can serve as a divider that separates previous activities (e.g., actions, tasks, events, etc.) from upcoming (e.g., future) activities, for example activities that are scheduled or are anticipated to take place. The previous activities can be scheduled activities, but this need not be the case. For example, previous activities can be actions performed that were not previously scheduled (e.g., taking pictures/video, physical activity, making purchases, etc.) As noted, data pertaining to such actions can be stored as action data 236.

In illustration, because data item 410 represents an action that occurred earliest, data item 410 can be presented in timeline 405 prior to data item 420, and indicator 460 can be presented in timeline 405 after data item 420, which also has already occurred, but prior to data items 430, 440. Further, because data item 430 represents an event scheduled to occur prior to an event represented by data item 440, data item 430 can be presented in timeline 405 prior to data item 440. In the present example, data items 410-440 and indicator 460 are temporally ordered from top to bottom, with the earliest data item 410 at the top and the latest data item 440 on the bottom. In other arrangements, data items 410-440 and indicator 460 can be temporally ordered from bottom to top, from left to right, or from right to left. Still, any other desired ordering can be implemented, and the present arrangements are not limited in this regard.

By way of example, data item 410 can be generated by a first application 158 representing an action of taking pictures (and/or videos) that occurred on the particular day 450. Data item 410 can include an indicator 412 indicating the first application, a time 414 when the pictures (and/or videos) were taken. Data item 410 also can include an indicator 416 indicating the action that was performed, and the captured images 418 (and/or videos).

Data item 420 can be generated by a second application 158 representing an exercise action that occurred on the particular day 450. Data item 420 can include an indicator 422 indicating the second application and a time 424 when the action took place. In this example, the action is steps walked by the user. Data item 420 can include an indicator 426 indicating the number of steps walked for the day by the indicated time. Further, data item 420 can include an indicator 428 indicating the number of steps walked on a previous day, for example "Yesterday." Accordingly, the user can compare his/her level of exercise for the current day to the previous day.

Data item 430 can be generated by a third application 158 representing a scheduled event. Data item 430 can include an indicator 432 indicating the third application and a time 434 when the event is scheduled to occur. View 400 also can include indicators 436, 438 indicating a nature of the event. For example, indicator 436 can indicate a product that is purchased and indicator 438 can indicate a delivery service that is scheduled to deliver the product. Optionally, data item 430 further can include an image 439 of the product.

Data item 440 can be generated by a fourth application 158 representing a scheduled event. Data item 440 can include an indicator 442 indicating the third application and a time 444 when the event is scheduled to occur. Data item 440 also can include an indicator 446 indicating the event and/or nature of the event. In this example, data item 440 represents a task to be completed. Thus, data item 440 can include a completion box 448. The user can select completion box 448 to indicate that the task has been completed. The user can again select completion box to change the status of the task from complete to incomplete, for example if the user inadvertently selected completion box 448 in the first place, or the status of the task changes. Responsive to the task being changed from incomplete to complete, or from complete to incomplete, data manager 156 can update task data 232 for data item 440 to indicate the new status. In another arrangement, responsive to the event being marked complete, referring to FIG. 2, data manager 156 can move the data item for that task from task data 232 to previous activity data 230. If a user changes a status of the task from complete to incomplete, data manager 156 can move the data item for that task from previous activity data 230 to task data 232. Further, responsive to a user changing the status of the event, data manager 156 can communicate information indicating the status change to the originating application 158 for the event, which the originating application 158 can process to update the corresponding data item it maintains.

At this point it should be noted that the respective data items 410-440 need not all be generated by different applications 158. For example, data items 430, 440 can be generated by the same application. Moreover, which application(s) generated the respective data items 430, 440 need not be placed sequentially in timeline 405. Instead, the data items can be temporally ordered, as previously described.

In this regard, presentation of data items 410, 420 representing actions, tasks, events, etc. that have already occurred allows users to easily track their day. Other examples of such actions, tasks, events, etc. include, but are not limited to, other types of physical activity, financial transactions, product purchases, and so on. Further, presentation of data items 430, 440 allows users quick access to view upcoming events, tasks, etc. Thus, users can easily see a quick overview of their day and see what events, tasks, etc. are still to come in the day, and the order in which they are scheduled to occur. In one arrangement, the user also can scroll down through timeline 405 to see upcoming events, tasks, etc. for future days, or scroll up through timeline 405 to see previous actions, events, tasks, etc.

FIG. 5 depicts another example of a view 500 presented by user interface 220. View 500 can present a timeline 505. In this example, in addition to data items for a current day, timeline 505 can include data items for one or more previous days. For instance, timeline 505 can include data items 510, 520, 530, 540. Further, timeline 505 can include an indicator 550 indicating the previous day, an indicator 560 indicating the current day, and an indicator 570 indicating the current time. Indicators 560 can serve as a divider that separates activities from a previous day from the present day's activities. Indicator 570 can serve as a divider that separates previous activities for the present day from future activities that are scheduled. Accordingly, the user can easily view information from one or more previous days, in addition to viewing information for the current day. In one arrangement, the user also can scroll down through timeline 505 to see upcoming events, tasks, etc. for future days.

Data item 510 can represent an action, task, event, etc. for a previous day. For example, data item 510 can represent previous activity performed "Yesterday," and timeline 505 can present data item 510 in the timeline after indictor 550, but prior to indicator 560, thus clearly indicating that the data item that the physical activity was performed "Yesterday, Monday March 21." Data item 510 may have been generated on the current data, but indicated as previous activity data 230 since it represents activity performed yesterday. Data item 510 also can include an indicator 512 of such activity, and an indicator 514 of activity performed the previous day (which was "Yesterday" from the perspective of Monday March 21). In one non-limiting arrangement, data manager 156 can update indicator 514 to indicate, for example, "Prior day" in lieu of "Yesterday," but the present arrangements are not limited in this regard. Data item 520 can be similar to data item 420 of FIG. 4.

Data item 530 can represent a weather forecast generated by an application 158 for a present or upcoming period of time. For example, data item 530 can represent a weather forecast at the top of a next hour for the user's current location (e.g., location of the system 100). The top of the hour can be represented by indicator 532. The weather can be represented by information 534 indicating the forecasted temperature at the top of the hour, high and low temperatures for the day, etc. Further, an image 536 can represent forecasted climate conditions, such as sunny, rainy, cloudy, etc.

Data item 540 can represent an upcoming event, task, etc. In this example, due to size of the view, a top portion of data item 540 may be initially presented, but the user can scroll down through the timeline to view the complete data item 540.

FIG. 6 depicts another example of a view 600 presented by user interface 220. View 600 can present a timeline 605. Timeline 605 can include data items 610, 620, 630, 640, 650 contributed by a plurality of applications 158 to data manager 156. In this example, data item 620 represents an event that is presently occurring. To indicate such, data manager 156 can apply a visual effect to data item 620. The visual effect can include presenting a boarder and/or text of data item 620 in bold, applying a color to data item 620, applying an indicator 622 to data item 620, or applying any other suitable visual effect. In one arrangement, since data item 620 indicates the current time (e.g., a time frame 624 including the current time), timeline 605 need not include another indicator (e.g., indicator 570 of FIG. 5) that indicates the current time. For example, data manager 156 can remove such other indicator when the time frame 624 encompasses the current time.

FIG. 7 depicts another example of a view 700 presented by user interface 220. View 700 can present a timeline 705. Timeline 705 can include data items 710, 720, 730, 740 contributed by a plurality of applications 158 to data manager 156, as well as an indicator 750 that indicates the current time. In this example, data item 710 can represent a purchase made by the user. Data item 710 can include an indicator 712 indicating the application 158 that provided the data item 710, an indicator 714 indicating the time of the purchase, an indicator 716 indicating the total purchase price, and an indicator 718 indicating where the purchase was made.

FIG. 8 depicts another example of a view 800 presented by user interface 220. View 800 can present a timeline 805. Timeline 805 can include data items 810, 820, 830 and, optionally, an indicator 840 that indicates the current time. Further, timeline 805 can include a data item 850 that provides a suggestion (or recommendation) to the user. The data item 850 can be generated by an application 158. When communicating the data item 850 to data manager 156, application can include with data item 850 information (e.g., metadata) indicating data item 850 represents a suggestion. Responsive to receiving data item 850, verifying that application 158 contributing data item 850 is authorized to do so, and identifying the information, data manager 156 can present data item 850 in timeline 805.

Further, data manager 156 can provide an indicator 852 in data item 850 indicating that data item 850 is a suggestion (or recommendation). In another arrangement, data manager 156 can apply a visual effect to the presentation of data item 850 to indicate that data item 850 is a suggestion (or recommendation). In addition, data item 850 can include an indicator 854 indicating the application 158 that provided data item 850. In the case that the recommendation is an event, data item 850 can include an indicator 856 indicating a time of the event. Further, data item 850 can include information 858 about the event, for example an event title. Optionally, data item 850 also can include additional information about the event, for example a location, a description, an admission price, a link to a website, etc.

Figure 9:
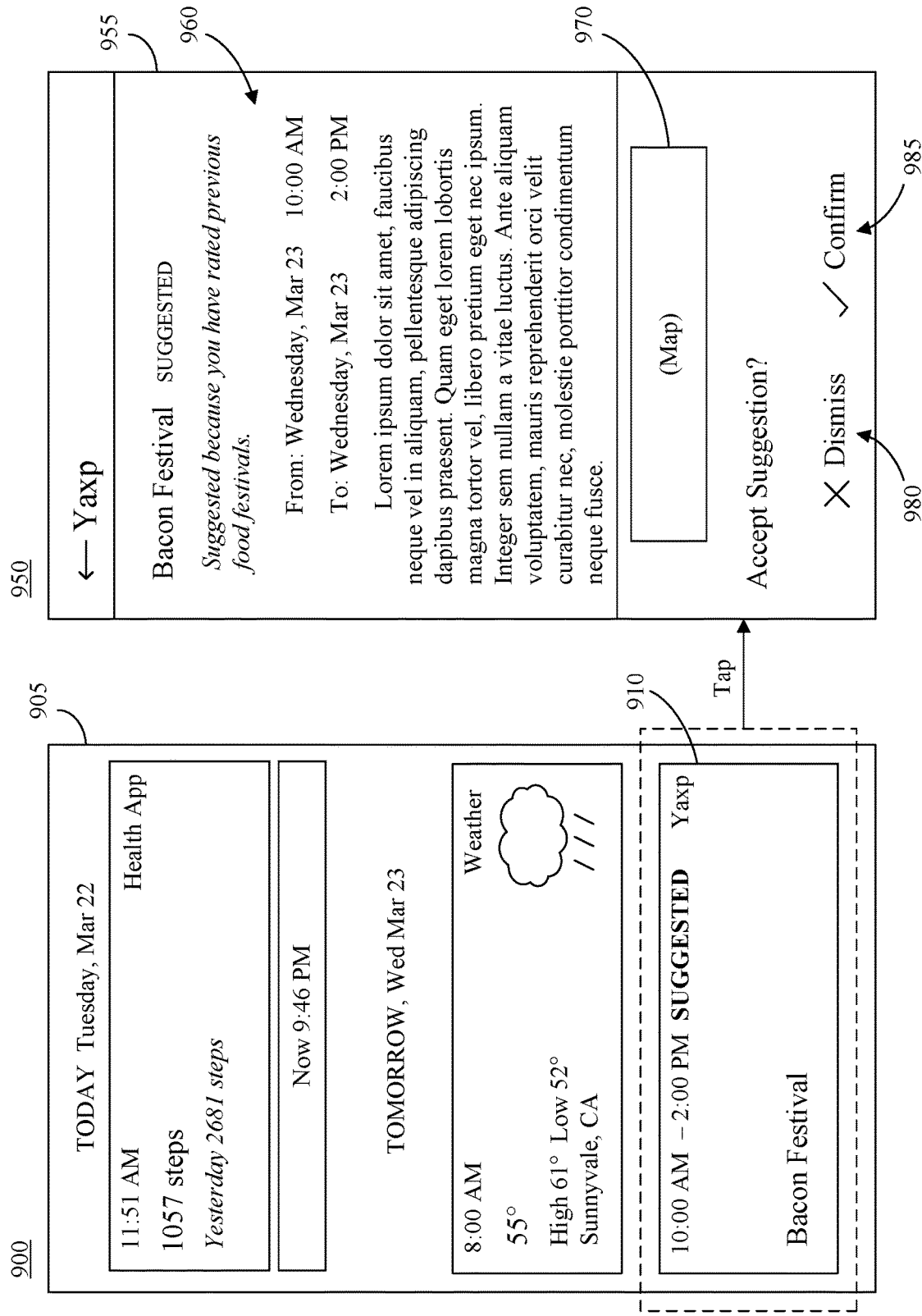
FIG. 9 depicts other examples of views presented by the user interface.

FIG. 9 depicts other examples of views 900, 950 presented by user interface 220. View 900 can present a timeline 905, and view 950 can be a detail view presenting detailed information 955 for a data item. Timeline 905 can present a data item 910 that provides a suggestion to the user, for example as described with reference to data item 850 of FIG. 8.

In this example, responsive to the user selecting data item 910, for example by tapping data item 910 on a touchscreen or selecting data item 910 with a pointing device, a method assigned to view 900 can generate a respective parameter and communicate the parameter to data manager 156. Responsive to receiving the parameter, data manager 156 can initiate user interface 220 to present (e.g., display) detailed information 955 for the data item 910. Detailed information 955 can include information 960 about the event represented/suggested by data item 910. The information 960 can identify the event, indicate why the event was suggested to the user, indicate when the event will take place, provide a description of the event, and so on. Further, view 950 can present a map 970 showing where the event is located. Map 970 can be part of the detailed information 955, or otherwise be presented in view 950. Map 970 can be a user interactive map, such as those known in the art. As such, the user can select map 970 to obtain directions to the event from the user's current location and/or from a specified location. In one arrangement, responsive to the user selecting map 970, data manager 156 and/or user interface 220 can open map 970 in a new view (not shown), or expand map 970 in view 950.

View 950 also can present a user selectable user interface element 980 the user may select to dismiss the event. Responsive to the user selecting the user interface element 980, data manager 156 can close the view 950, return to the view 900, and remove data item 910 from timeline 905. View 950 also can present a user selectable user interface element 985 the user may select to confirm the event. Responsive to the user selecting the user interface element 985, data manager 156 can create a new event for the user and add the new event to event data 234 (FIG. 2). If the event is scheduled to occur on a day for which data items are included in timeline 905, data manager 156 can place a data item for the event in the appropriate temporal location in the timeline 905.

In one arrangement, data manager 156 need not notify the application 158 that provided the data item 910 of the user's selection to dismiss or confirm the event. Instead, if the user confirms the event, data manager 156 can maintain data related to the event and present a data item corresponding to the event in one or more timelines, when appropriate. If the user dismisses the event, data manager 156 can delete or otherwise disregard data item 910.

In another arrangement, data manager 156 can notify the application 158 that provided the data item 910 of the user's selection to dismiss or confirm the event. If the user confirms the event, data manager 156 can create a data item for the event, assign a unique ID to the data item, and communicate the data item/unique ID to the originating application 158. In one aspect, data manager 156 can provide the data item/ unique ID through an access point provided for that data item by the originating application 158.

Figure 10:
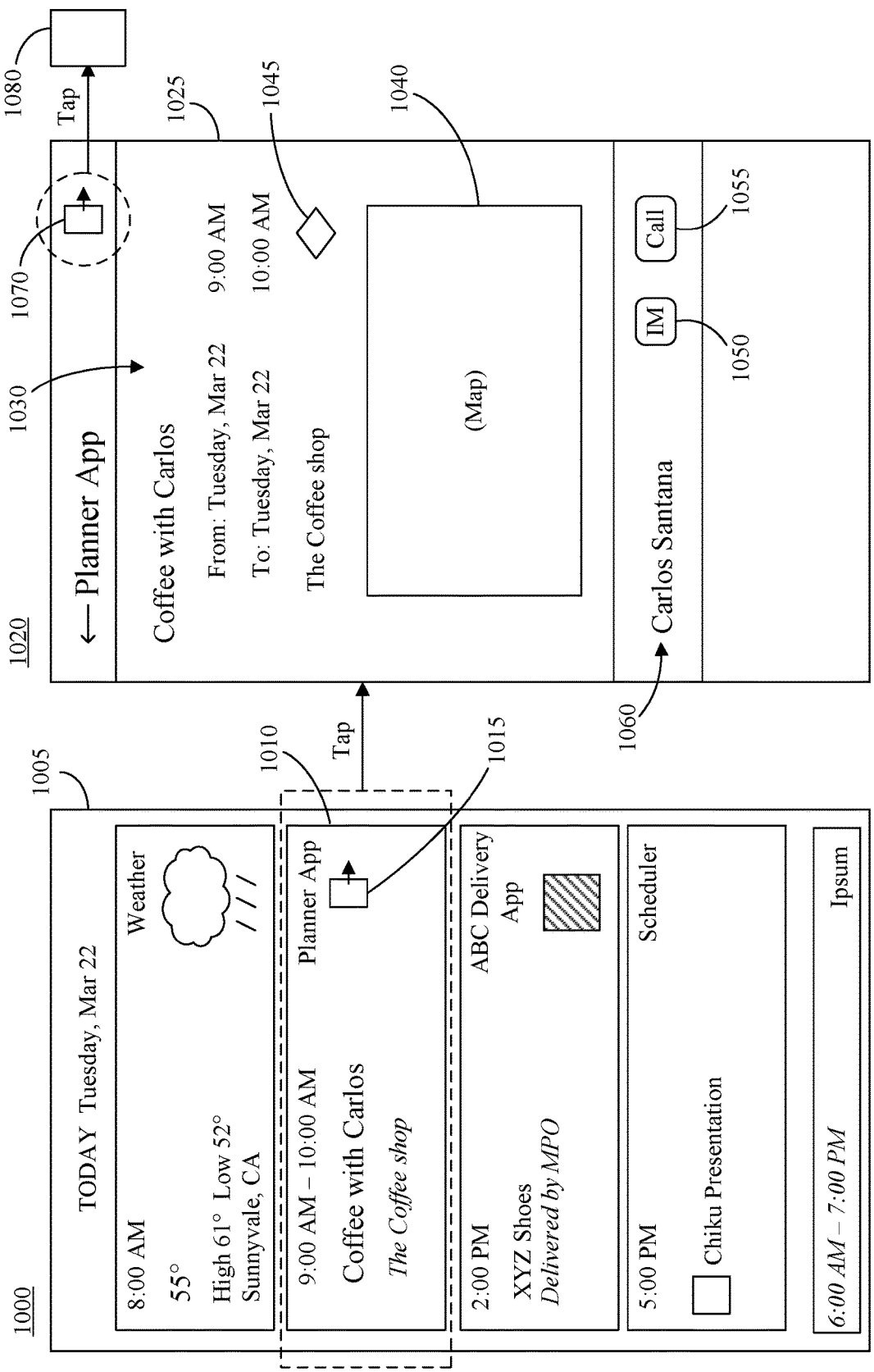
FIG. 10 depicts other examples of views presented by the user interface.

FIG. 10 depicts other examples of views 1000, 1020 presented by user interface 220. View 1000 can present a timeline 1005, and view 1020 can be a detail view presenting detailed information 1025 for a data item. Timeline 1005 can present a data item 1010, for example a scheduled event.

In this example, responsive to the user selecting data item 1010, for example by tapping data item 1010 on a touchscreen or selecting data item 1010 with a pointing device, data manager 156 can initiate user interface 220 to present detailed information 1025 for data item 1010. Detailed information 1025 can include information 1030 about the event represented by data item 1010. The information 1030 can identify the event, indicate who else may be attending the event, indicate when the event will take place, provide a description of the event, and so on. Further, view 1020 can present a map 1040 showing where the event is located. Map 1040 can be part of information 1030, or otherwise be presented in view 1020. Map 1040 can be a user interactive map, such as those known in the art. As such, the user can select map 1040 to obtain directions to the event from the user's current location and/or from a specified location. In one arrangement, responsive to the user selecting map 1040, data manager 156 and/or user interface 220 can open map 1040 in a new view (not shown), or expand map 1040 in view 1020. In one arrangement, view 1020 can include a user selectable user interface element 1045 (e.g., an icon, button, etc.) the user may select to generate a parameter that initiates a mapping application to generate the directions, or open a dialog in which the user may interact with the mapping application to generate the directions.

View 1020 also can include one or more user selectable user interface elements 1050, 1055 the user may select to initiate communication with at least one other person attending the event. User interface elements 1050, 1055 can be presented proximate to (e.g. immediately next to) an identifier 1060 indicating the other person. Responsive to the user selecting user interface element 1050, data manager 156 can initiate an instant messaging application. Further, data manager 156 can interface with the instant messaging application to provide an instant messaging address for the other person, and initiate opening of an instant message addressed to the other person, for example using a user identifier or telephone number. Responsive to the user selecting user interface element 1055, data manager 156 can initiate a telephonic communication application. Further, data manager 156 can interface with the telephonic communication application to provide a user identifier or telephone number for the other person, and initiate a telephone call to the other person. Data manager 156 can obtain contact information (e.g., user identifier and/or telephone number) by interfacing with a contact management application that stores such information.

View 1020 also can present a user selectable user interface element 1070, such as an icon, button, etc. Responsive to the user selecting the user interface element 1070, a method assigned to user interface element 1070 can generate a respective parameter and communicate the parameter to data manager 156. Responsive to receiving the parameter, data manager 156 can access data item 1010 in the application 158 that originated data item 1010. In illustration, data manager 156 can initiate application 158 to present data item 1010. Further, data manager 156 can initiate a communication link between data manager 156 and application 158. In another arrangement, data manager 156 can access data item 1010 in the application 158 that originated data item 1010 directly from view 1000. For example, a user interface element 1015 can be presented in data item 1010 in timeline 1005, and the user can select user interface element 1015 to generate a parameter that initiates data manager 156 to access data item 1010 in the application 158 that originated data item 1010. In a further arrangement, both user interface element 1015 and user interface element 1070 can be presented in the respective views 1000 and 1020.

Figure 11:
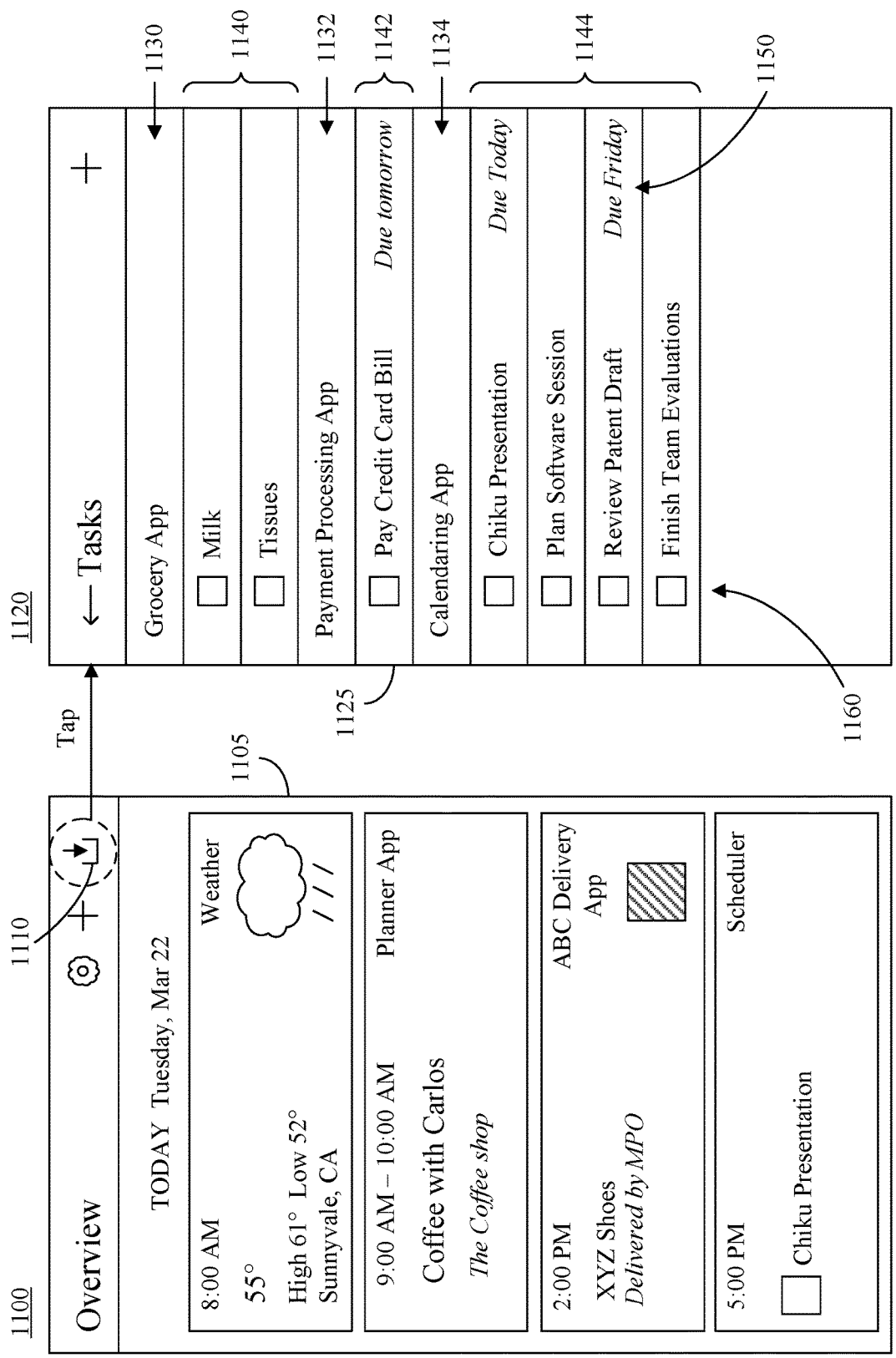
FIG. 11 depicts other examples of views presented by the user interface.

Responsive to the user selecting user interface element 1070 (or user interface element 1015), data manager 156 can initiate a view 1080 (not scaled to size) that presents data item 1010 in the originating application 158. Accordingly, the user can view the data item 1010 in the originating application 158, and interact with the originating application 158 to modify, update and/or delete data item 1010. Nonetheless, the user also may modify, update and/or delete data item 1010 via interacting with data manager 156, as will be described. At this point it should be noted that user interface elements 1045, 1050, 1055, 1070 are mere examples of user interface elements that data manager 156 can include in view 1020, but data manager 156 can include any of a myriad of user interface elements to provide other functionalities (e.g., shortcuts, links, etc.). In this regard, data manager 156 can select user interface elements to present in various views based on the nature/type of data items associated with the views. Moreover, originating applications 158 can specify various types of user interface elements appropriate for use with specific types of data items. FIG. 11 depicts other examples of views 1100, 1120 presented by user interface 220. View 1100 can present a timeline 1105. Further, view 1100 can present a user selectable user interface element 1110. Responsive to a user selecting user interface element 1110, a method assigned to user interface element 1110 can generate a respective parameter and communicate the parameter to data manager 156. Responsive to receiving the parameter, data manager 156 can present view 1120. View 1120 can present a filtered (e.g., condensed) listing 1125 of data items representing tasks. In another arrangement, view 1120 can present a filtered listing of data items representing events, or a filtered listing of data items representing tasks and events. Further, additional user interface elements (not shown) can be presented in view 1100 to initiate presentation of another view that presents a filtered listing of data items representing events and/or a filtered listing of data items representing tasks and events. View 1120 will be described with respect to data items representing tasks, but it will be understood that the present arrangements are not limited in this regard.

Listing 1125 can include indicators 1130, 1132, 1134 indicating respective applications 158 that have contributed to data manager 156 data items representing tasks. Indicators 1130-1134 can be, for example, names of the respective applications 158, icons representing the respective applications 158, etc. Further, listing 1125 can include indicators representing data items 1140, 1142, 1144 contributed by the respective applications 158. Indicators 1140-1144 can be, for example, text indicating the various tasks and/or subjects of the various tasks. Listing 1125 can group indicators 1140-1144. For simplicity, for the remainder of the description of FIG. 11, indicators 1130-1134 will be referred to simply as "applications" and indicators 1140-1144 will be referred to simply as "tasks." Tasks 1140 generated by application 1130 can be grouped with application 1130 in listing 1125, for example under or next to application 1130. Similarly, task 1142 generated by application 1132 can be grouped with application 1132, and tasks 1144 generated by application 1134 can be grouped with application 1134. Accordingly, view 1120 provides an easy and convenient way for the user to quickly browse various tasks 1140-1144, and see the respective applications 1130-1134 with which the tasks 1140-1144 are associated.

Each individual grouping of tasks 1140-1144 can maintain the same temporal constraints previously described (e.g., tasks in each group are presented in temporal order). In another arrangement, each individual grouping of tasks 1140-1144 can be ordered using different constraints. For example, even if the timeline 1105 only presents actions, events and tasks for a particular day (e.g., today), listing 1125 can show all of today's incomplete tasks, all of this week's incomplete tasks, all of this month's incomplete tasks, or all incomplete tasks, regardless of date. The time frame over which incomplete tasks are to be included in listing 1125 can be a default value or specified by the user, for example using a configuration menu. Optionally, tasks completed on the particular day also can be included in listing 1125.

Listing 1125 also can present, at least for some tasks 1140-1144, indicators 1150 indicating when tasks are due. Tasks 1140-1144 for which indicators 1150 are presented can be, for example, tasks identified as being important and/or critical. Such identification can be provided by the respective originating applications 1130-1134, for example as metadata provided with the data items or in data item fields.

Further, next to each task 1140-1144 (e.g., immediately to the left, right, above or below each task), listing 1125 can present respective completion boxes 1160. The user can select a completion box 1160 to indicate a respective task 1140-1144 is complete, or deselect a completion box 1160 to change the status to incomplete. Responsive to a user changing a status of a task 1140-1144, data manager 156 can update task data 232 to indicate the new status. In one arrangement, responsive to a task 1140-1144 being marked complete, referring to FIG. 2, data manager 156 can move the data item for that task from task data 232 to previous activity data 230. If a user changes a status of a task 1140-1144 from complete to incomplete, data manager 156 can move the data item for that task from previous activity data 230 to task data 232. Further, responsive to a user changing a status of a task 1140-1144, data manager 156 can communicate information indicating the status change to the originating application 158 for the task, which the originating application 158 can process to update the corresponding data item it maintains.

Figure 12A:
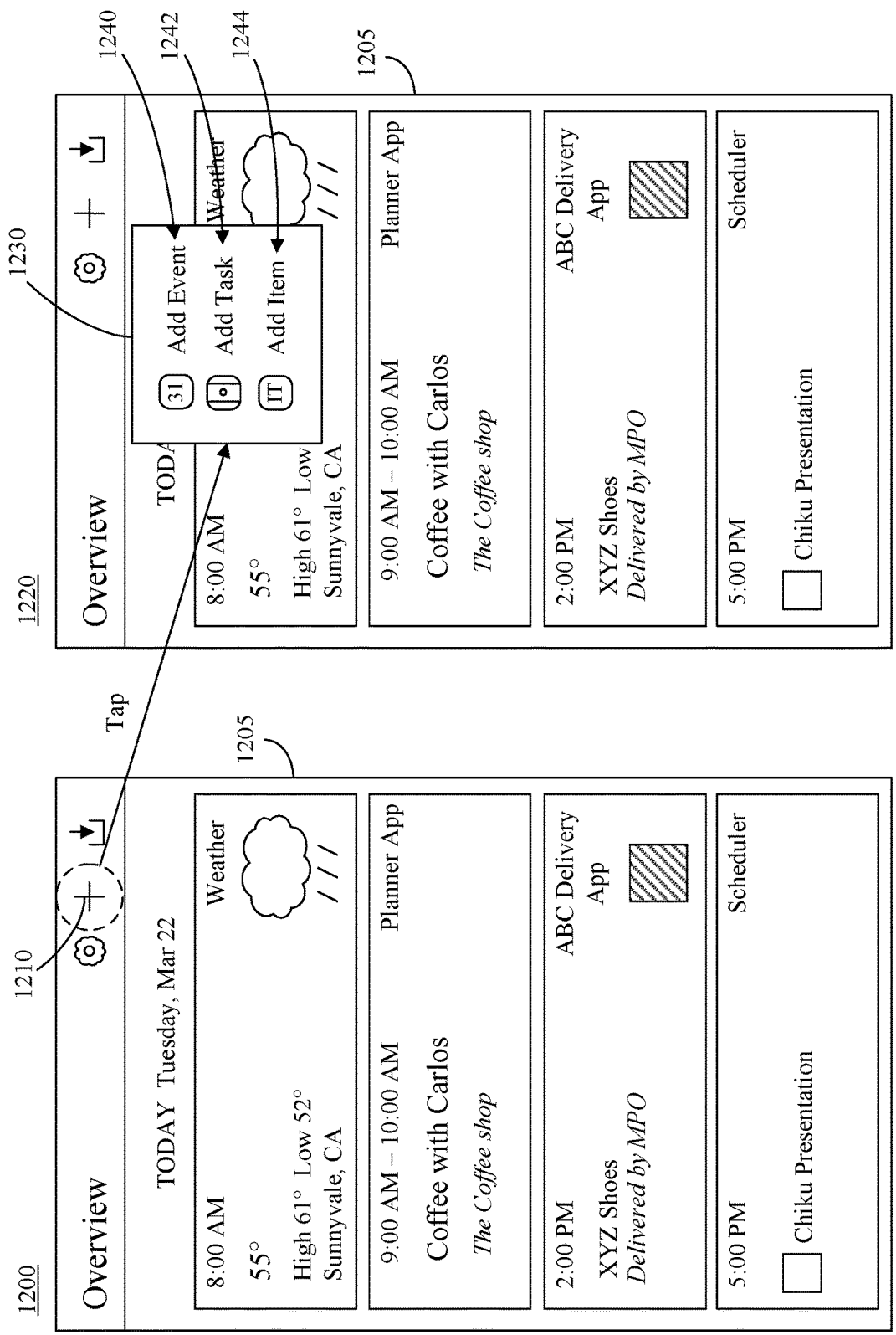
FIGS. 12A and 12B depict other examples of views presented by the user interface.
Figure 12B:
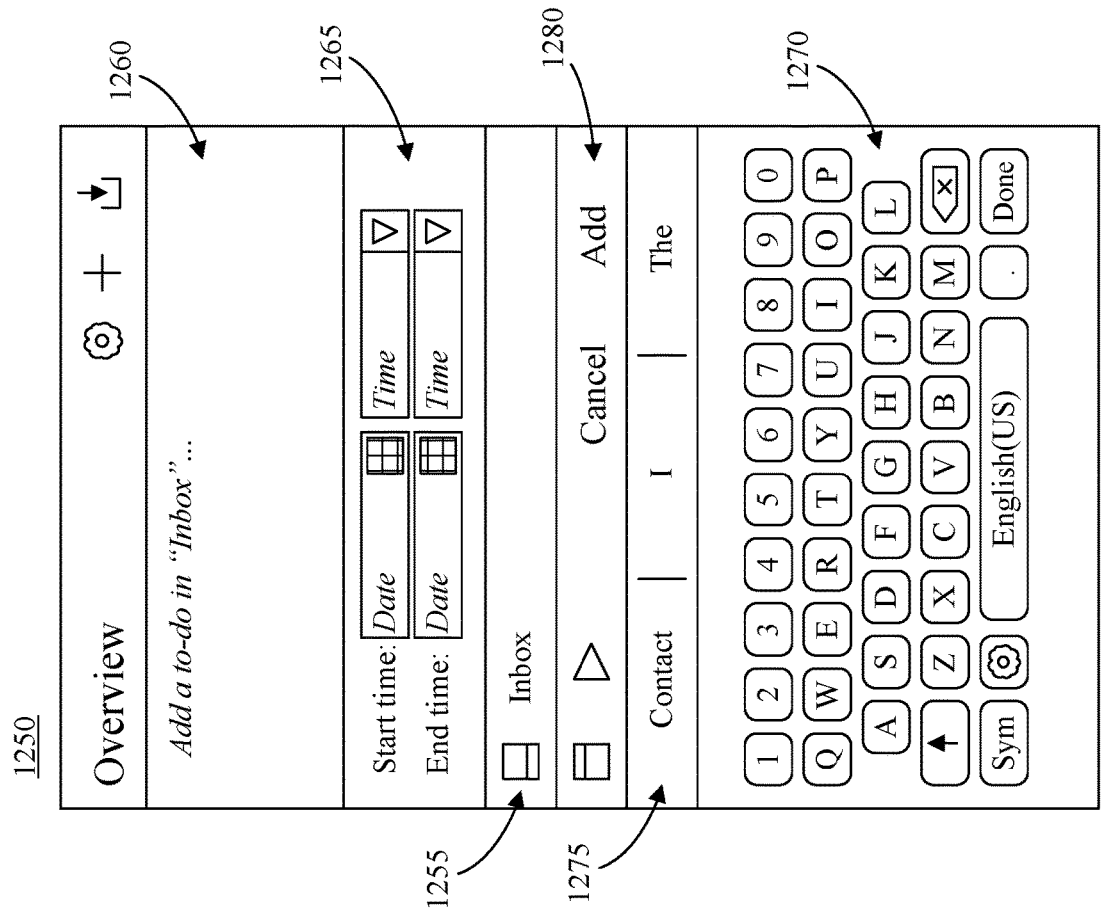

FIG. 12A depicts other examples of views 1200, 1220 presented by user interface 220, and FIG. 12B depicts another example of a view 1250 presented by user interface 220. View 1200 can present a timeline 1205. Further, view 1200 can present a user selectable user interface element 1210. Responsive to a user selecting user interface element 1210, a method assigned to user interface element 1210 can generate a respective parameter and communicate the parameter to data manager 156. Responsive to receiving the parameter, data manager 156 can present a menu 1230, depicted in view 1220. Menu 1230 can present user selectable options 1240, 1242, 1244 for the user to add a data item for an event or a task, or add another type of data item, respectively. Responsive to the user selecting a menu option 1240-1244, a method assigned to the selected menu option 1240-1244 can generate a respective parameter and communicate the parameter to data manager 156. In response to receiving the parameter, data manager 156 can initiate presentation of view 1250 by user interface 220.

View 1250 can include a menu field 1255 from which the user can choose various placement options of where to place the item and/or to choose an application 158 with which to associate the data item and/or to authorize to modify and/or update the data item. View 1250 also can present a data entry field 1260 in which the user can enter information for the data item being added. Further, view 1250 can include a field 1265 in which the user can enter a start time (e.g., data and time), and an end time for event, task, etc. represented by the data item.

In the case that the system 100 does not have a physical keyboard, view 1250 also can present a virtual keyboard 1270 which the user can use to enter information into the fields 1260, 1265. Further, view 1250 can present fields 1275 with suggested words for data entry, as is known in the art. View 1250 also can present a field 1280 comprising user selectable user interface elements the user can select to add the data item, cancel the data item, and initiate other functionality related to the data item. If the user merely selects a location for storing the data item in field 1255 without selecting an external application 158 to associate with the data item, or merely accepts a default location for the data item, data manager 156 can define fields 1260-1280.

In one arrangement, the view 1250 can be dynamically changed based on a menu selection in menu field 1255. For example, in one non-limiting arrangement, one or more of fields 1260-1280 can be defined by an application 158 selected in field 1255. Application 158, however, need not execute in order for fields 1260-1280 to be presented, nor to generate the data item. As noted, applications 158 can register with data manager 156, for example as described with reference to FIG. 3. During the registration process, data manager 156 can communicate requests to applications 158 to communicate data defining and/or specifying various fields to be presented in various views for data items associated with applications 158, including fields 1260-1280 of view 1250. The data also can specify methods (e.g., computer program code) assigned to the various fields for managing data items, including methods for adding new data items. The data can define/specify fields and/or methods for various data item types. Responsive to receiving the data, data manager 156 can register the data for the respective applications 158. For example, data manager 156 can store the data with application permissions 238 and/or another suitable data storage location, and create associations between the data and the respective applications 158. Applications 158 can update such data at any given time by authenticating with data manager 156 using assigned tokens, for example in response to applications 158 being updated.

In another arrangement, one or more applications 158 can register with data manager 156 their own user interfaces for creating data items. Responsive to the user selecting an option 1240, 1242, 1244 from menu 1230, a method assigned to the selected menu option 1240-1244 can generate a respective parameter and communicate the parameter to data manager 156. In response, data manager 156 can initiate presentation of a user interface of the application 158 corresponding to the option 1240, 1242, 1244 selected by the user, and that user interface can present view 1250 for creating the data item. Which application's user interface is presented can be determined, for example, based on which user selectable option 1240, 1242, 1244 is selected. Further, application 158 corresponding to the selected option 1240, 1242, 1244 can create the data item, hand user interface control back to data manager 156, and also pass the data item to data manager 156 as a new data item.

Responsive to a user selecting from menu field 1255 a menu item indicating a particular application 158, and perhaps a particular data item type, data manager 156 can access the data provided by application 158 during the registration process to determine fields 1260-1280 to be presented and the corresponding methods, and generate view 1250 using such data. In the case a particular data item type is selected, fields 1260-1280 and methods can correspond to the selected data item type. As with presentation of fields 1260-1280, the methods can be executed without requiring application 158 to execute since the methods are included in the data previously provided to data manager 156, for example during registration of application 158 with data manager 156 and/or one or more subsequent updates of the data. In another arrangement, data manager 156 can define fields 1260-1280. Regardless, if the user chooses from menu field 1255 an option to associate the data item with a particular application 158, responsive to the user choosing to add the data item (e.g., by selecting "Add" in field 1280), data manager 156 can store the data item, for example as a task in task data 232, as an event in event data 234, or as another type of data item in another suitable data repository.

In an arrangement, in which application 158 presents view 1250, application 158 also can store a copy of the data item internally. In another arrangement, during registration with data manager 156, application 158 can indicate to data manager 156 to communicate data items associated with application 158 to application 158 responsive to such data items being created. Accordingly, data manager 156 can communicate the data items to application 158 responsive to the data items being created, for example using the previously described programmatic interface of data manager 156. The programmatic interface can initiate application 158 to execute, briefly in the background, to process and store the data item.

In another arrangement, the application 158 with which the user associates the data item need not be executed in order for the user to associated the data item with application 158. Instead, data manager 156 can indicate such association with the data item. For example, application 158 can be configured to, when executed, synchronize with data manager 156. During such synchronization, data manager 156 can communicate the data item to the selected application 158. In a further arrangement, during registration with data manager 156, application 158 can communicate to data manager 156 information indicating a data repository (e.g., data table) where data items for application 158 are to be stored, and data manager 156 can store the data item in such data repository. In any case, at some point responsive to application 158 executing, application 158 can add the data item to its list of data items managed, at least in part, by that application 158. Further, the data manager 156 can assign to the data item a unique identifier for the data item, and communicate the unique ID to the application with the data item. As noted, application 158 can use the ID to update and/or modify the data item with data manager 156.

As described, in addition to aggregating information from applications 158 external to data manager 156 and allowing users to create new items for such applications 158, data manager 156 also can provide its own information and actions. For example, data manager 156 can provide its own management capabilities for events, tasks, actions and other types of data items. Users can create data items representing events, tasks, actions, etc. directly within views presented by data manager 156 via user interface 220. Such data items can incorporate information contributed by applications 158 either directly or by reference, and data manager 156 can provide any required user interface views and data management capabilities that may be necessary to interact with those events, tasks, actions, etc., without actually executing applications 158 that are originators of the data items and/or with which the data items are otherwise associated.

In illustration, when planning for an upcoming day or reflecting on the day's activities by reviewing various views presented by data manager 156, users may think of new data items they want to create. The arrangements described herein allow users to initiate creating a new data item by allowing applications 158 external to data manager 156 to register support for adding new data items. When the user chooses to add a new data item, via various views presented by user interface 220, data manager 156 can show a choice of possible data items the user might want to add. In one arrangement, the registering application 158 can provide the user interface view for creating a data item when the user selects that application 158. In another arrangement, data manager 156 can provide, via user interface 220, one or more views for creating different types of data items, and an application 158 can specify those views to use as part of registering a data item.

Data manager 156 also can create custom views based on the types and/or nature of data items. In one arrangement, data manager 156 can synthesize (e.g., generate dynamically) historical views to allow users to identify patterns that occur over time. For example, data manager 156 can generate a historical view that includes data items related to fitness data. At least some of the data items in the historical view can be dynamically generated by data manager 156 based on historical data. In illustration, data manager 156 can analyze historical data items (e.g., previous activity data 230) to generate results from such analysis, and generate one or more data items representing the results. For instance, data manager 156 can generate a graph representing levels of physical activity over time. Such historical view can allow users to determine whether their performance is improving over time. In another example, data manager 156 can provide a historical view of financial data. Such historical views can help users determine if their monthly spending is increasing or decreasing over time. Data manager 156 may include only data from a single application in each historical view, or data manager 156 can aggregate data from data items gathered across a plurality of applications 158.

In the latter case, certain data items may duplicate the same information (e.g., both the user's financial management and bank applications contribute data items for the same transaction). Notwithstanding, data manager 156 can disambiguate entries for identical transactions by comparing data item types, values, timestamps, and other associated data in the data items. Based on such comparison, data manager 156 can merge data items and/or exclude from analysis duplicate data represented by a plurality of data items representing the same transaction.

In a further arrangement, data manager 156 can synthesize summary views for a day's activities at the beginning or end of the day. These views can provide compact visualizations of users' planned or actual activities to help them plan for future activities and/or reflect on past activities.

FIG. 13 is a flow chart illustrating an example of a method 1300 of managing a plurality of data items contributed by a plurality of applications. At step 1305, a plurality of data items can be managed using a processor. The plurality of data items can be managed based on knowledge and meaning of content of the plurality of data items. The plurality of data items can be contributed by a plurality of applications. The plurality of data items can include at least scheduled events, scheduled tasks and previous activities.

At step 1310, information corresponding to at least the scheduled events, scheduled tasks and previous activities can be presented. For example, managing the plurality of data items can include managing displaying content of the plurality of data items. In one aspect, presenting the information corresponding to at least the scheduled events, scheduled tasks and previous activities can include presenting a summary view of the respective data items. The plurality of data items can be temporally ordered.

FIG. 14 is a flow chart illustrating another example of a method 1400 of managing a plurality of data items contributed by a plurality of applications. At step 1405, data manager 156 can register an application 158 to contribute data items to data manager 156, for example as described with reference to FIGS. 2 and 3. Further, during the registration, data manager 156 can request application 158 to register data, including data that defines/specifies fields and/or methods (e.g., computer program code) for various types of data item types, including methods for adding new data items. At step 1410, data manager 156 can assign a data token to application 158, communicate the data token to application 158, and store a copy of the data token.

At step 1415, data manager 156 can receive from application 158 a new data item and the data token. At step 1420, data manager 156 can validate the data token. At step 1425, responsive to the data token successfully validating, data manager 156 can add the data item to a timeline.

Figure 15:
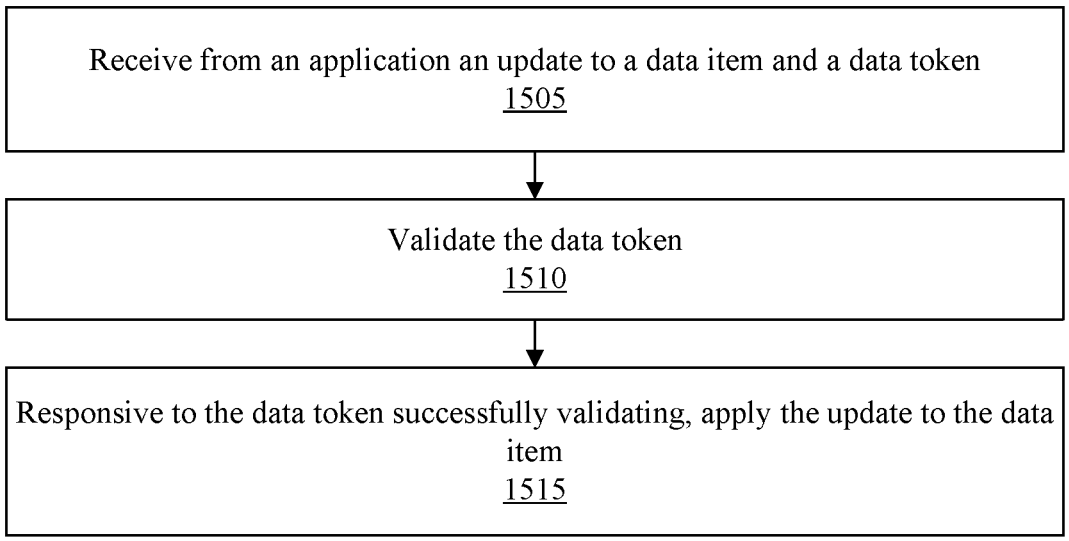
FIG. 15 is a flow chart illustrating an example of a method of updating a data item.

FIG. 15 is a flow chart illustrating an example of a method 1500 of updating a data item. At step 1505, data manager 156 can receive from application 158 an update to a data item and a data token. At step 1510, data manager 156 can validate the data token. At step 1515, responsive to the data token successfully validating, data manager 156 can apply the update to the data item.

Figure 16:
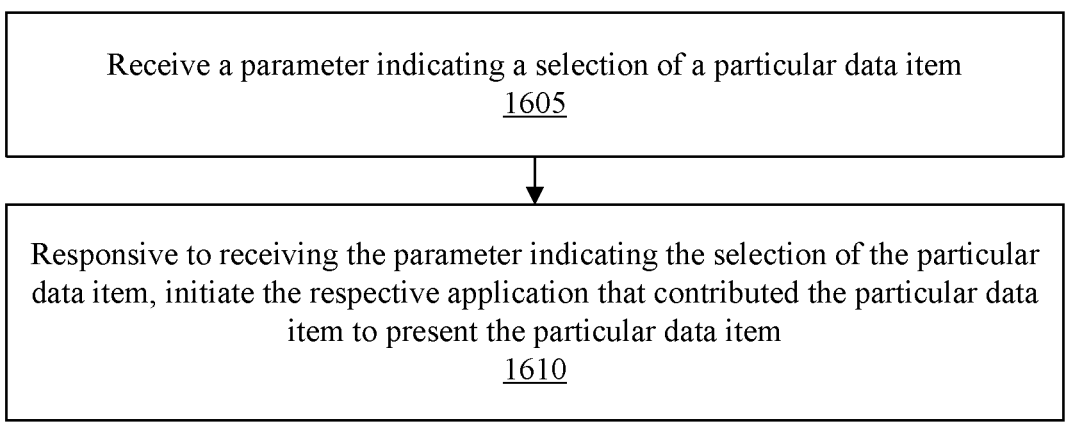
FIG. 16 is a flow chart illustrating an example of a method presenting a data item by an application that contributed the data item.

FIG. 16 is a flow chart illustrating an example of a method presenting a data item by an application that contributed the data item. At step 1605, data manager 156 can receive a parameter indicating a selection of a particular data item. At step 1610, responsive to receiving the parameter indicating the selection of the particular data item, data manager 156 can initiate the respective application 158 that contributed the particular data item to present the particular data item.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process. As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

In the context of the arrangements disclosed herein, a "method" for performing various steps disclosed in the flowchart and claims that follow is distinct from a "method" which is a collection of computer program code statements grouped together to perform an operation (e.g., a Java™ method), for example a method assigned to a user interface element or view. In this regard, the two different terms "method" are homonyms and homographs in that they are spelled and pronounced the same, but have different meanings. Based on the context in which the terms are used, they should not be confused.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method comprising:
    managing, using a processor, a plurality of data items contributed by a plurality of applications, the plurality of data items includes at least scheduled events, scheduled tasks and previous activities;
    receiving, by a data manager, from the applications, data defining methods, in the form of computer program code assigned to various fields, for adding new data items to the plurality of data items in respective ones of the various fields;
    registering, by the data manager, the methods for the respective applications;
    receiving a first user input initiating addition of a first new data item to the plurality of data items, the first new data item belonging to a first application of the plurality of applications;
    adding, by the data manager, the first new data item to the plurality of data items by executing a first method defined by the data received from the first application and without executing the first application;

receiving a second user input initiating addition of a second new data item to the plurality of data items, the second new data item belonging to a second application of the plurality of applications;

adding, by the data manager, the second new data item to the plurality of data items by executing a second method defined by the data received from the second application and without executing the second application;

assigning a respective data token to each respective application, wherein the respective application is configured to update respective data item by authenticating with the data manager by providing to the data manager the data token assigned to the respective application; and presenting information corresponding to at least the scheduled events, scheduled tasks and previous activities, wherein the plurality of data items is managed based on knowledge and meaning of content of the plurality of data items.

2. The method of claim 1, wherein managing the plurality of data items comprises managing displaying content of the plurality of data items.

3. The method of claim 2, wherein the plurality of data items is temporally ordered.

4. The method of claim 1, wherein presenting the information corresponding to at least the scheduled events, scheduled tasks and previous activities comprises presenting a summary view of the respective data items.

5. The method of claim 1, further comprising: presenting a detail view of the respective data items.

6. The method of claim 1, further comprising: receiving a parameter indicating a selection of a particular data item; and responsive to receiving the parameter indicating the selection of the particular data item, initiating the respective application that contributed the particular data item to present the particular data item.

7. The method of claim 1, further comprising: synthesizing a historical view of a portion of the plurality of data items that each correspond to a particular data item type.

8. The method of claim 1, wherein presenting the information corresponding to at least the scheduled events, scheduled tasks and previous activities comprises: presenting, in a user interface, an indication of each application to which each respective information corresponds.

9. An apparatus comprising:
a memory configured to store instructions;
a processor coupled to the memory, wherein the processor, in response to executing the instructions, is configured to initiate operations comprising:
managing a plurality of data items contributed by a plurality of applications, the plurality of data items includes at least scheduled events, scheduled tasks and previous activities;
receiving, by a data manager, from the applications, data defining methods, in the form of computer program code assigned to various fields, for adding new data items to the plurality of data items in respective ones of the various fields;
registering, by the data manager, the methods for the respective applications;
receiving a first user input initiating addition of a first new data item to the plurality of data items, the first new data item belonging to a first application of the plurality of applications;

adding, by the data manager, the first new data item to the plurality of data items by executing a first method defined by the data received from the first application and without executing the first application;

receiving a second user input initiating addition of a second new data item to the plurality of data items, the second new data item belonging to a second application of the plurality of applications;

adding, by the data manager, the second new data item to the plurality of data items by executing a second method defined by the data received from the second application and without executing the second application;

assigning a respective data token to each respective application, wherein the respective application is configured to update respective data item by authenticating with the data manager by providing to the data manager the data token assigned to the respective application; and presenting information corresponding to at least the scheduled events, scheduled tasks and previous activities, wherein the plurality of data items is managed based on knowledge and meaning of content of the plurality of data items.

10. The apparatus of claim 9, wherein managing the plurality of data items comprises managing displaying content of the plurality of data items.

11. The apparatus of claim 10, wherein the plurality of data items is temporally ordered.

12. The apparatus of claim 9, wherein presenting the information corresponding to at least the scheduled events, scheduled tasks and previous activities comprises presenting a summary view of the respective data items.

13. The apparatus of claim 9, the operations further comprising:
presenting a detail view of the respective data items.

14. The apparatus of claim 9, the operations further comprising: receiving a parameter indicating a selection of a particular data item; and responsive to receiving the parameter indicating the selection of the particular data item, initiating the respective application that contributed the particular data item to present the particular data item.

15. The apparatus of claim 9, the operations further comprising: synthesizing a historical view of a portion of the plurality of data items that each correspond to a particular data item type.

16. The apparatus of claim 9, wherein presenting the information corresponding to at least the scheduled events, scheduled tasks and previous activities comprises: presenting, in a user interface, an indication of each application to which each respective information corresponds.

17. A computer program product comprising a non-transitory computer readable storage medium having program code stored thereon, the program code executable by a processor to perform operations comprising:
managing a plurality of data items contributed by a plurality of applications, the plurality of data items includes at least scheduled events, scheduled tasks and previous activities;
receiving, by a data manager, from the applications data, defining methods, in the form of computer program code assigned to various fields, for adding new data items to the plurality of data items in respective ones of the various fields;
registering, by the data manager, the methods for the respective applications;

receiving a first user input initiating addition of a first new data item to the plurality of data items, the first new data item belonging to a first application of the plurality of applications;

adding, by the data manager, the first new data item to the plurality of data items by executing a first method defined by the data received from the first application and without executing the first application;

receiving a second user input initiating addition of a second new data item to the plurality of data items, the second new data item belonging to a second application of the plurality of applications;

adding, by the data manager, the second new data item to the plurality of data items by executing a second method defined by the data received from the second application and without executing the second application;

assigning a respective data token to each respective application, wherein the respective application is configured to update respective data item by authenticating with the data manager by providing to the data manager the data token assigned to the respective application; and presenting information corresponding to at least the scheduled events, scheduled tasks and previous activities, wherein the plurality of data items is managed based on knowledge and meaning of content of the plurality of data items.

18. The computer program product of claim 17, wherein managing the plurality of data items comprises managing displaying content of the plurality of data items.

19. The computer program product of claim 18, wherein the plurality of data items is temporally ordered.

20. The computer program product of claim 17, wherein presenting the information corresponding to at least the scheduled events, scheduled tasks and previous activities comprises presenting a summary view of the respective data items.

21. The computer program product of claim 17, the operations further comprising: presenting a detail view of the respective data items.

22. The computer program product of claim 17, the operations further comprising: receiving a parameter indicating a selection of a particular data item; and responsive to receiving the parameter indicating the selection of the particular data item, initiating the respective application that contributed the particular data item to present the particular data item.

23. The computer program product of claim 17, the operations further comprising: synthesizing a historical view of a portion of the plurality of data items that each correspond to a particular data item type.

24. The computer program product of claim 17, wherein presenting the information corresponding to at least the scheduled events, scheduled tasks and previous activities comprises: presenting, in a user interface, an indication of each application to which each respective information corresponds.

* * * * *